(12) United States Patent
Kaneko

(10) Patent No.: US 11,252,932 B2
(45) Date of Patent: Feb. 22, 2022

(54) ANIMAL LITTER BOX

(71) Applicant: UNICHARM Corporation, Shikokuchuo (JP)

(72) Inventor: Shinya Kaneko, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 178 days.

(21) Appl. No.: 16/787,540

(22) Filed: Feb. 11, 2020

(65) Prior Publication Data
US 2020/0260684 A1    Aug. 20, 2020

(30) Foreign Application Priority Data
Feb. 19, 2019    (JP) .............................. JP2019-027102

(51) Int. Cl.
*A01K 1/01*    (2006.01)

(52) U.S. Cl.
CPC .................................. *A01K 1/0114* (2013.01)

(58) Field of Classification Search
CPC ...... A01K 1/01; A01K 1/0107; A01K 1/0114; A01K 23/005; A01K 29/00; A61B 5/208
USPC ........................................ 119/165, 166, 168
See application file for complete search history.

(56) References Cited

U.S. PATENT DOCUMENTS

| | | | |
|---|---|---|---|
| 5,249,549 A | 10/1993 | Rockaitis | |
| 6,701,868 B1 * | 3/2004 | Shepherd | A01K 1/0114 119/161 |
| 8,316,801 B1 * | 11/2012 | Nottingham | A01K 1/0117 119/169 |

(Continued)

FOREIGN PATENT DOCUMENTS

WO    2017104216 A1    6/2017

OTHER PUBLICATIONS

English Abstract and Machine Translation for International Publication No. WO 2017/104216 A1, published Jun. 22, 2017, 14 pgs.

(Continued)

*Primary Examiner* — Yvonne R Abbott-Lewis
(74) *Attorney, Agent, or Firm* — Fredrikson & Byron, P.A.

(57) ABSTRACT

An animal litter box (100) includes: a litter-box main portion (1) including an upper container (10) and a lower container (30); an output main portion (60) including an output portion (61); and a position regulator. The upper container (10) includes a plurality of holes (h) passing through the upper container in the up-down direction, and the lower container (30) includes a reception portion (32) that receives excrement that has passed through the plurality of holes (h). The output portion (61) includes: a top surface (61*a*) that comes into contact with the litter-box main portion (1); and a side wall (61*b*) extending from an edge of the top surface (61*a*) in the up-down direction. The output portion (61) outputs a signal in accordance with a magnitude of a force that acts on the top surface (61*a*). The position regulator includes: a litter-box-side regulating portion (26) disposed on the litter-box main portion (1); and an output-side regulating portion (62) disposed on the output main portion (60). The output-side regulating portion (62) is a portion different from the side wall (61*b*). The position regulator regulates a relative position between the litter-box main portion (1) and the output main portion (60) in at least one of the front-back direction and the left-right direction.

23 Claims, 18 Drawing Sheets

(56) References Cited

U.S. PATENT DOCUMENTS

| | | | |
|---|---|---|---|
| 8,797,166 B2* | 8/2014 | Triener | A01K 29/005 |
| | | | 340/573.1 |
| 10,729,096 B2* | 8/2020 | Orgias | H01M 10/488 |
| 11,129,356 B2* | 9/2021 | Klatt | A01K 1/0114 |
| 2011/0315084 A1* | 12/2011 | Miller | A01K 1/011 |
| | | | 119/166 |
| 2018/0359987 A1 | 12/2018 | Kaneko | |

OTHER PUBLICATIONS

Extended European Search Report for European Application No. EP20154352.7, dated Jun. 19, 2020, 10 pgs.
Office Action issued by the European Patent Office for corresponding European Application No. EP 20154352.7, dated Feb. 5, 2021, 8 pgs.

* cited by examiner

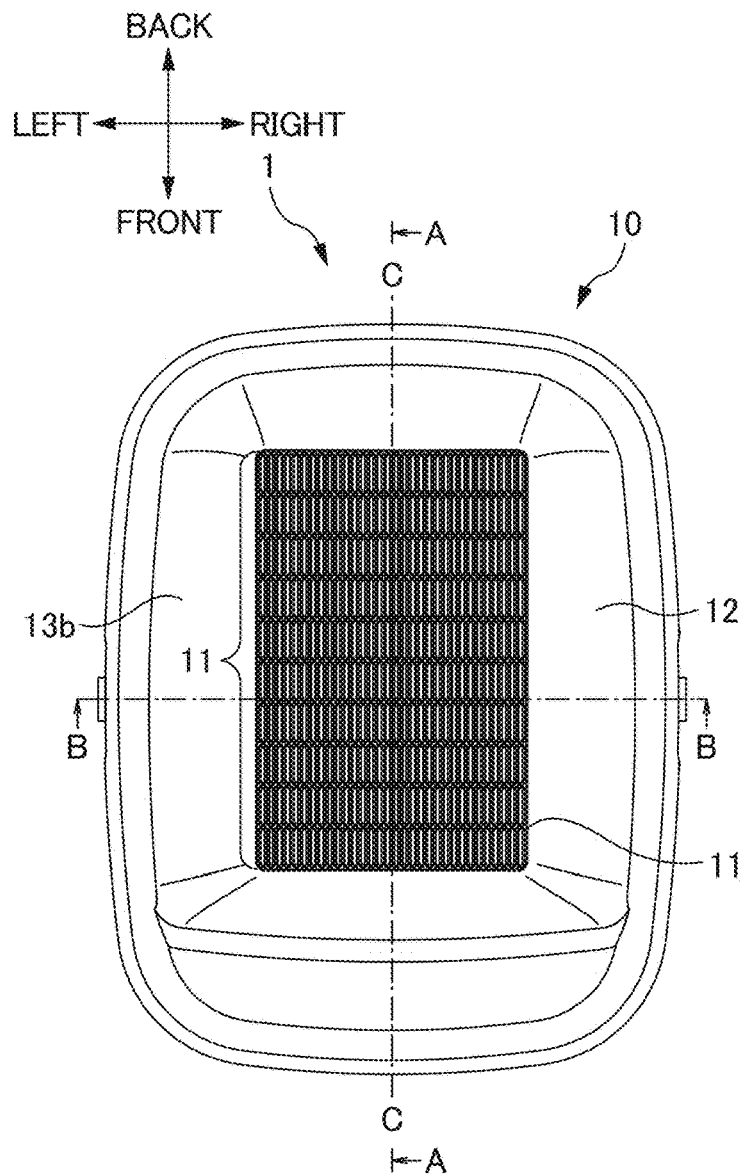
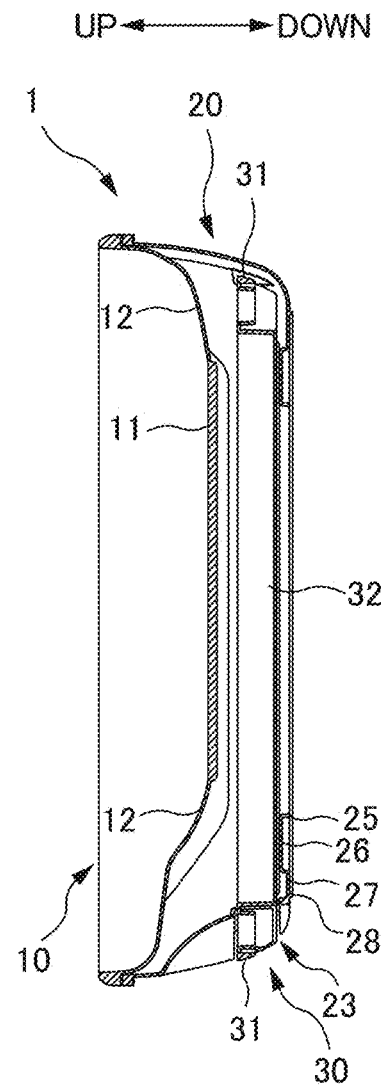
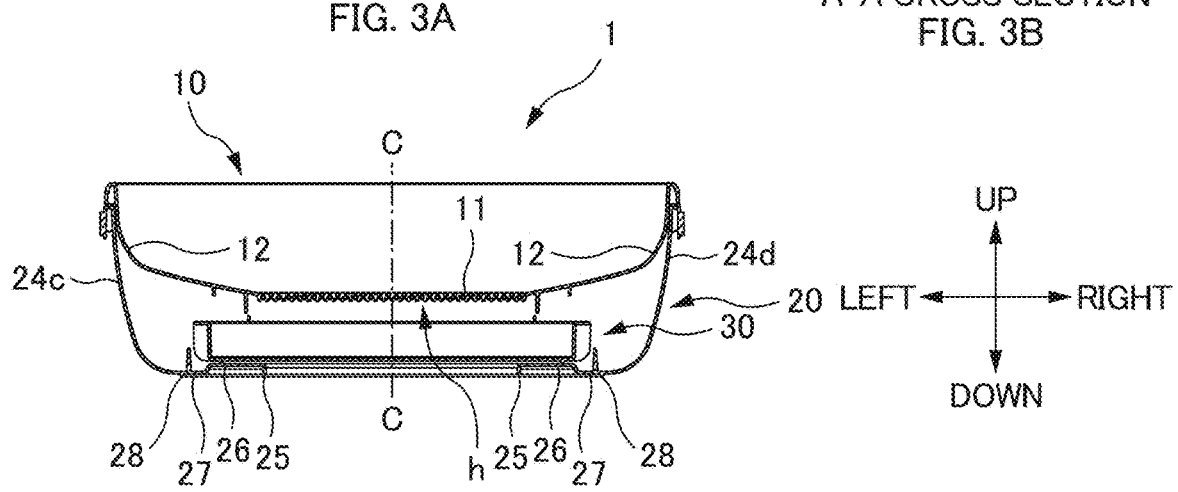
FIG. 3A
A-A CROSS SECTION
FIG. 3B
B-B CROSS SECTION
FIG. 3C

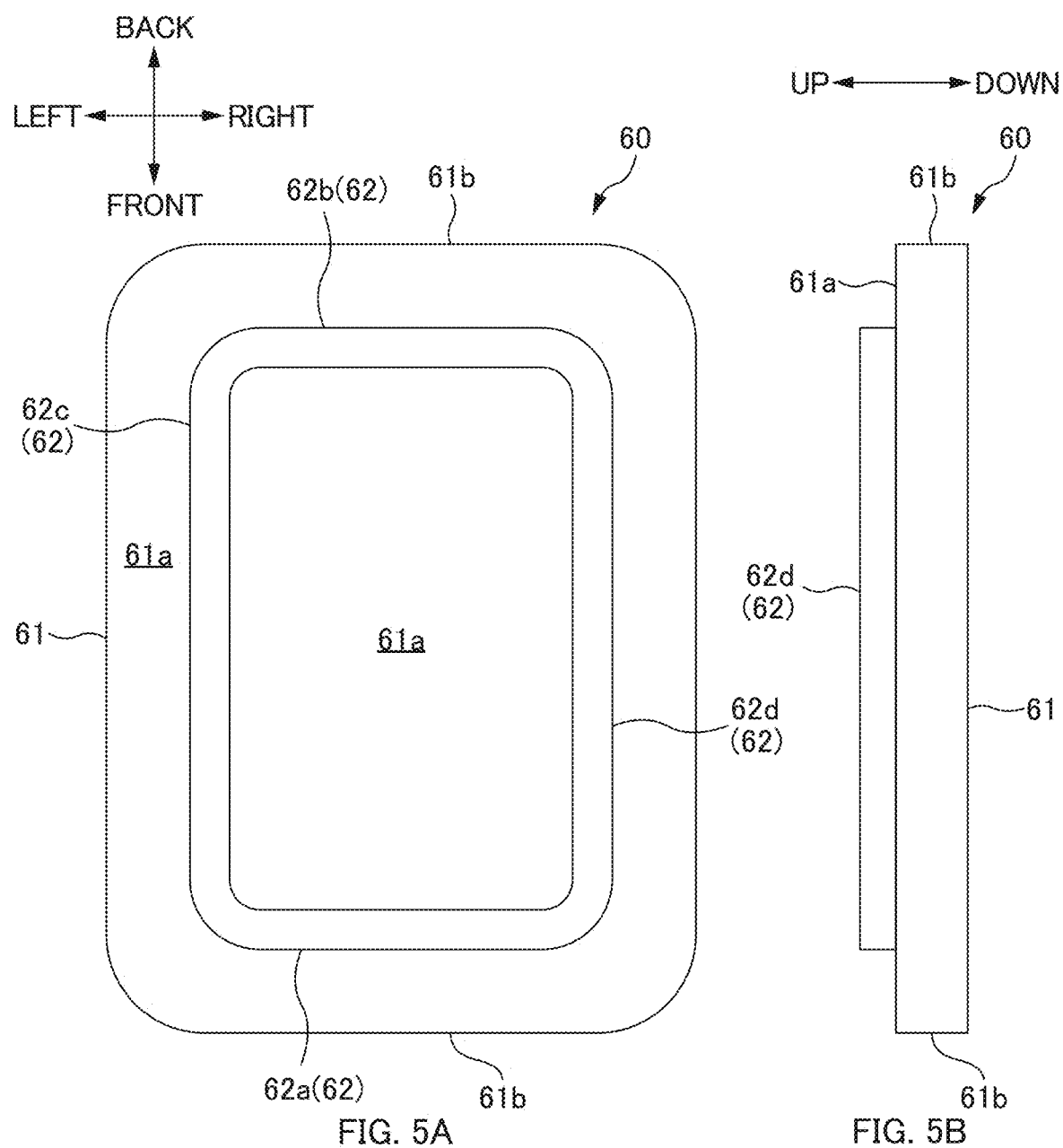
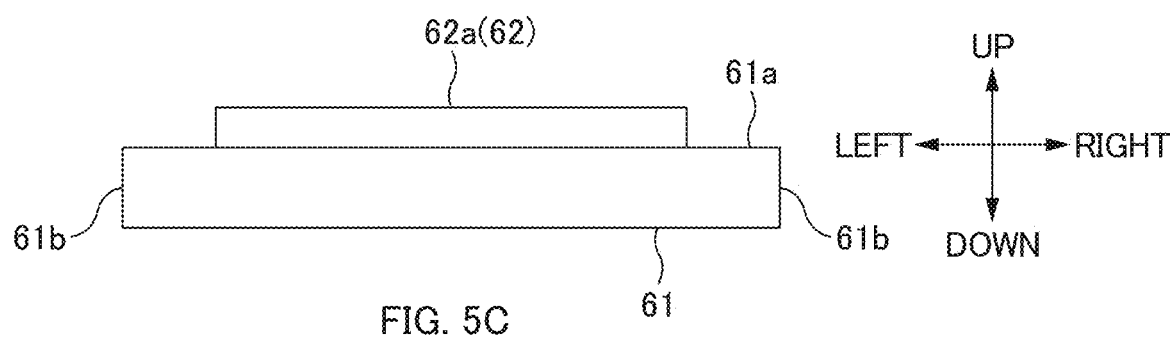
FIG. 5A  FIG. 5B
FIG. 5C

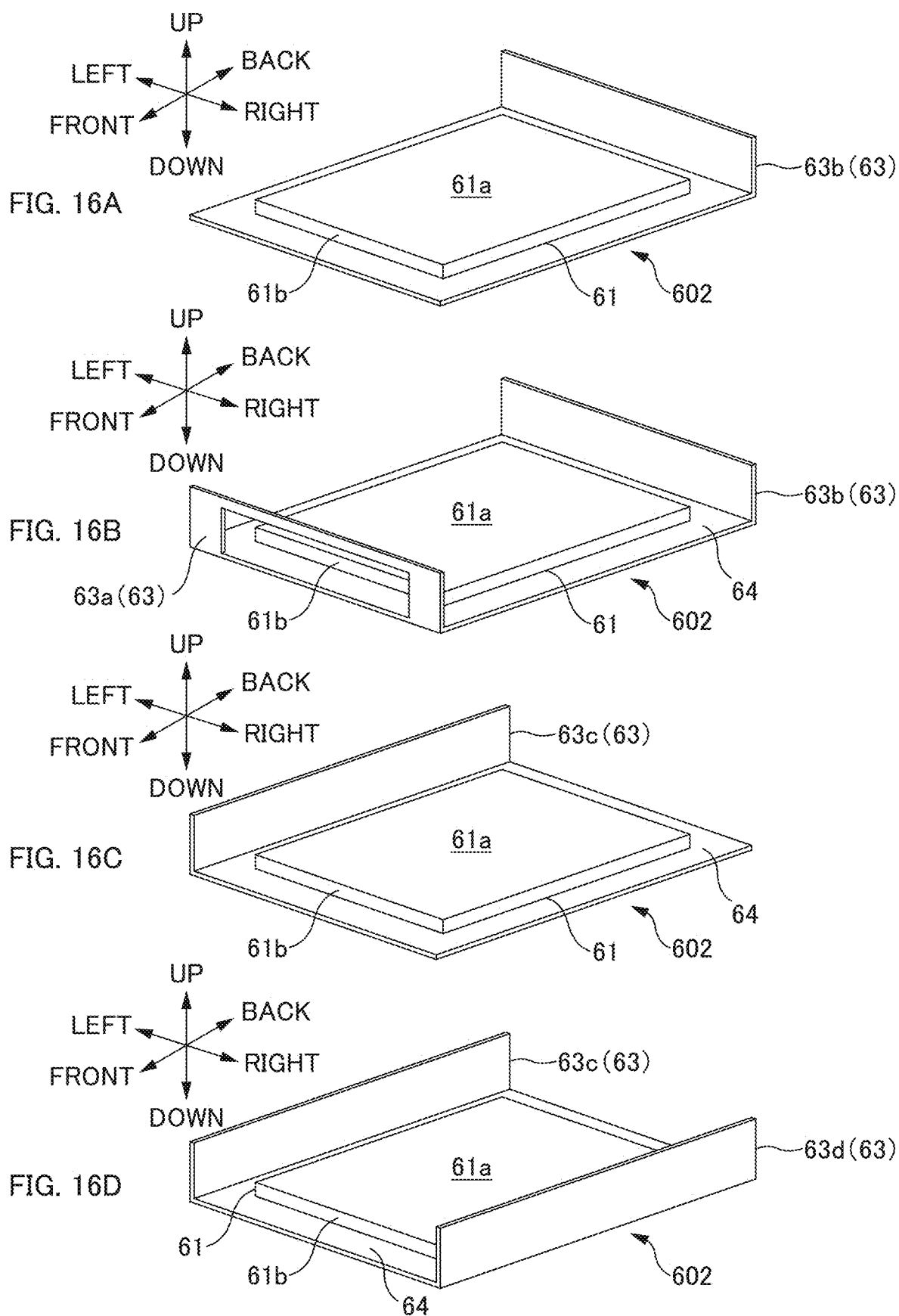

ANIMAL LITTER BOX

RELATED APPLICATIONS

This application claims priority to Japanese Application No. 2019-027102, filed Feb. 19, 2019, the teachings of which are incorporated herein by reference.

TECHNICAL FIELD

The present invention relates to an animal litter box.

BACKGROUND ART

As an animal litter box, known is an animal litter box used by animals (e.g., cats) that are kept indoors. As described in PTL 1, also known is a pet toilet 1 including a first weight scale 21 and a second weight scale 22 that measure the weight of excrement of an animal and the body weight of the animal. In the pet toilet 1 described in PTL 1, a main container 10 including an excretion tray 13 and the like is disposed on the upper side of a supporting part 15 provided with the first weight scale 21 and the second weight scale 22. The first weight scale 21 of the pet toilet 1 supports the excretion tray 13 to which the weights of a measurement table 12 and an animal is not applied, and the first weight scale 21 measures the weight of excrement by measuring a change in the weight of the excretion tray 13 due to presence or absence of excrement.

CITATION LIST

PTL

[PTL 1] WO2017/104216

SUMMARY OF INVENTION

Technical Problem

When an animal (e.g., a cat) jumps onto the pet toilet 1 described in PTL 1 from the front side of the pet toilet 1 or the like to excrete, a force from the front side toward the back side is more likely to be applied to the main container 10. Consequently, there is a risk of the main container 10 being displaced with respect to the supporting part 15. The main container 10 is, however, not easily displaced toward the back side with respect to the supporting part 15 because the first weight scale 21 disposed on the supporting part 15 is in contact with the excretion tray 13 by passing through a hole in a bottom portion of the main container 10 and thus, even when an animal jumps onto the pet toilet 1 from the front side thereof, the main container 10 abuts a side surface of the first weight scale 21.

However, a force from the main container 10 is applied multiple times to the side surface of the first weight scale 21 and causes the first weight scale 21 to break or malfunction, and therefore there is a risk that it is impossible to accurately measure the weight of excrement of an animal and the body weight of the animal.

The present invention was achieved in light of conventional problems such as that described above, and an aspect of the present invention is to provide an animal litter box capable of more accurately measuring the weight of an animal and the weight of excrement while reducing the risk of a litter-box main portion being displaced with respect to an output main portion.

Solution to Problem

A main aspect of the present invention for achieving the above-described aspect is an animal litter box having a front-back direction, a left-right direction, and an up-down direction,
the animal litter box including:
a litter-box main portion including an upper container and a lower container;
the upper container including a plurality of holes passing through the upper container in the up-down direction,
the lower container including a reception portion,
the reception portion receiving excrement that has passed through the plurality of holes;
an output main portion including an output portion,
the output portion including a top surface and a side wall,
the top surface coming into contact with the litter-box main portion,
the side wall extending from an edge of the top surface in the up-down direction,
the output portion being configured to output a signal in accordance with a magnitude of a force that acts on the top surface; and
a position regulator including a litter-box-side regulating portion and an output-side regulating portion,
the litter-box-side regulating portion disposed on the litter-box main portion,
the output-side regulating portion disposed on the output main portion,
the output-side regulating portion being a portion different from the side wall,
a relative position between the litter-box main portion and the output main portion in at least one of the front-back direction and the left-right direction being regulated by the position regulator.

Features of the present invention other than the above will become clear by reading the description of the present specification with reference to the accompanying drawings.

Advantageous Effects of Invention

According to the present invention, for example, when an animal jumps onto an animal litter box, it is possible to facilitate more accurate measurement of the weight of the animal and the weight of excrement of the animal by reducing the risk of an output portion breaking while reducing the risk of a litter-box main portion being displaced in a front-back direction or a left-right direction with respect to an output main portion.

BRIEF DESCRIPTION OF THE DRAWINGS

FIG. 3A is a schematic plan view of a litter-box main portion 1 from which a cover 40 is detached,
FIG. 3B is a schematic central cross-sectional view, which is a sectional view taken along A-A in FIG. 3A,
and FIG. 3C is a schematic central sectional view, which is a sectional view taken along C-C in 3A.

FIG. 5A is a schematic plan view of an output main portion 60. FIG. 5B is a schematic right side view of the output main portion 60. FIG. 5C is a schematic front side view of the output main portion 60.

FIG. 16A is a schematic perspective view of the output main portion 602 of a modification of the third embodiment. FIG. 16B is a schematic perspective view of the output main portion 602 of a modification of the third embodiment. FIG. 16C is a schematic perspective view of the output main portion 602 of a modification of the third embodiment. FIG. 16D is a schematic perspective view of the output main portion 602 of a modification of the third embodiment.

DESCRIPTION OF EMBODIMENTS

Figure 1:
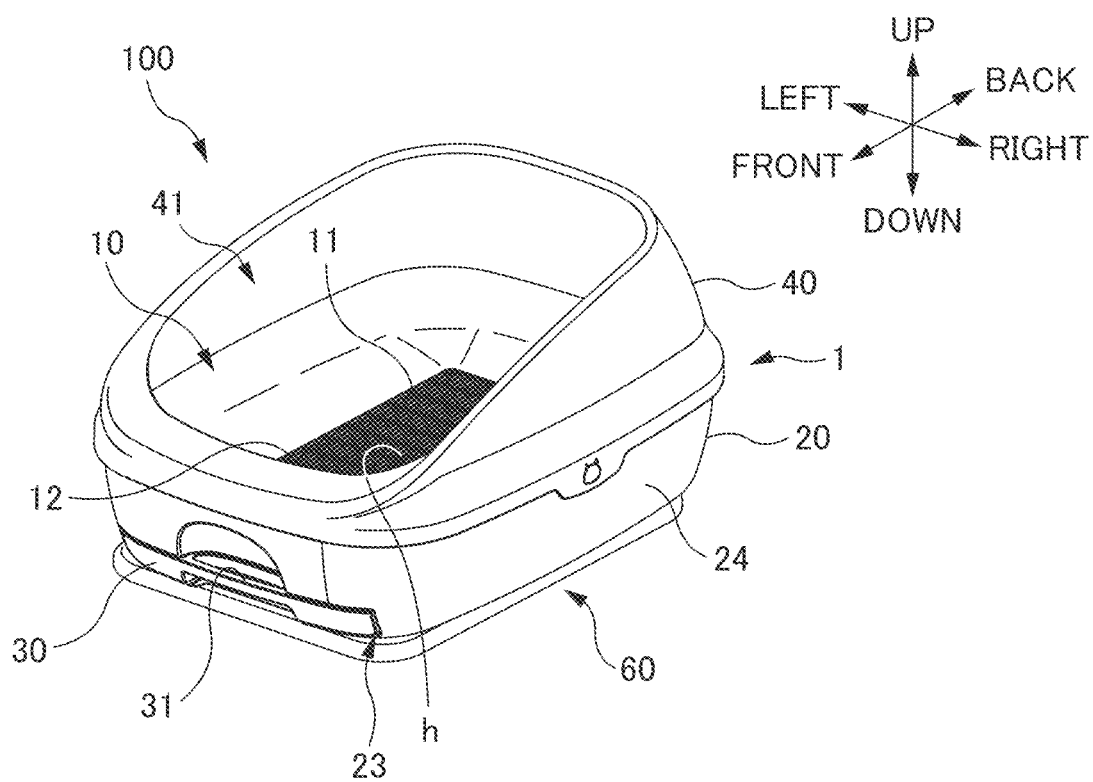
FIG. 1 is a schematic perspective view of an animal litter box 100 of a first embodiment.

At least the following matters will become clear with the description of this specification and the attached drawings.

An animal litter box having a front-back direction, a left-right direction, and an up-down direction,
the animal litter box comprising:
a litter-box main portion including an upper container and a lower container;
the upper container including a plurality of holes passing through the upper container in the up-down direction,
the lower container including a reception portion,
the reception portion receiving excrement that has passed through the plurality of holes;
an output main portion including an output portion,
the output portion including a top surface and a side wall,
the top surface coming into contact with the litter-box main portion,
the side wall extending from an edge of the top surface in the up-down direction,
the output portion being configured to output a signal in accordance with a magnitude of a force that acts on the top surface; and
a position regulator including a litter-box-side regulating portion and an output-side regulating portion,
the litter-box-side regulating portion disposed on the litter-box main portion,
the output-side regulating portion disposed on the output main portion,
the output-side regulating portion being a portion different from the side wall,
a relative position between the litter-box main portion and the output main portion in at least one of the front-back direction and the left-right direction being regulated by the position regulator.

According to such an animal litter box, for example, when an animal jumps onto an animal litter box, it is possible to facilitate more accurate measurement of the weight of the animal and the weight of excrement of the animal by reducing the risk of an output portion breaking while reducing the risk of a litter-box main portion being displaced in a front-back direction or a left-right direction with respect to an output main portion.

In such an animal litter box, it is desirable
that the litter-box-side regulating portion is a litter-box-side recess disposed on a lower surface of the litter-box main portion and being recessed toward an upper side,
that the output-side regulating portion is an output-side projection projecting toward the upper side from the top surface, and
that the position regulator regulates the relative position between the litter-box main portion and the output main portion in at least one of the front-back direction and the left-right direction,
the regulating being performed by engaging the litter-box-side recess and the output-side projection with each other.

According to such an animal litter box, the litter-box-side recess and the output-side projection that are engaged with each other abut on each other in the front-back direction or the left-right direction, and this makes it possible to reduce the risk of the position of the litter-box main portion being displaced in the front-back direction or the left-right direction with respect to the output main portion.

In such an animal litter box, it is desirable that
the relative position in the front-back direction between the litter-box main portion and the output main portion is regulated by engaging the litter-box-side recess and the output-side projection with each other.

According to such an animal litter box, for example, when an animal jumps onto the animal litter box from the front side or the back side, it is possible to reduce the risk of the front-back-direction position of the litter-box main portion being displaced with respect to the output main portion.

In such an animal litter box, it is desirable that
the litter-box-side recess and the output-side projection are located on a front side and a back side with respect to a front-back-direction center of the animal litter box.

According to such an animal litter box, for example, when an animal jumps onto the animal litter box from the front side or the back side, it is possible to further reduce the risk of the front-back-direction position of the litter-box main portion being displaced with respect to the output main portion.

In such an animal litter box, it is desirable that
the relative position in the left-right direction between the litter-box main portion and the output main portion is regulated by engaging the litter-box-side recess and the output-side projection with each other.

According to such an animal litter box, for example, when an animal jumps onto the animal litter box from another side in the left-right direction, it is possible to reduce the risk of the left-right-direction position of the litter-box main portion being displaced with respect to the output main portion.

In such an animal litter box, it is desirable that
the litter-box-side recess and the output-side projection are located on a one side and another side with respect to a left-right-direction center of the animal litter box.

According to such an animal litter box, for example, even when an animal jumps onto the animal litter box from the one side or the other side in the left-right direction, it is possible to further reduce the risk of the left-right-direction position of the litter-box main portion the being displaced with respect to the output main portion.

In such an animal litter box, it is desirable
that the litter-box-side recess and the output-side projection are located on a front side and a back side with respect to a front-back-direction center of the animal litter box, and
that the litter-box-side recess and the output-side projection are located on a one side and another side with respect to a According to such an animal litter box, for example, even when an animal jumps onto the animal litter box in any direction, it is possible to further reduce the risk of the left-right-direction position of the litter-box main portion the being displaced with respect to the output main portion.

In such an animal litter box, it is desirable
that the litter-box main portion includes a litter-box largest projection that projects lowest,
the litter-box largest projection disposed on the lower surface of the litter-box main portion, and
that the litter-box-side recess is disposed inside in the front-back direction and the left-right direction with respect to the litter-box largest projection.

According to such an animal litter box, even when a large force is applied to the litter-box main portion in the front-back direction or the left-right direction, abutting the output-side projection of the output main portion on the litter-box largest projection makes it possible to reduce the risk of the litter-box main portion being largely displaced in the front-back direction or the left-right direction with respect to the output main portion.

In such an animal litter box, it is desirable
that the litter-box main portion includes an outer adjacent projection and an inner adjacent projection on the lower surface of the litter-box main portion,
the outer adjacent projection and the inner adjacent projection being adjacent to the litter-box-side recess in the front-back direction or the left-right direction, and that the litter-box largest projection projects lower with respect to the outer adjacent projection.

According to such an animal litter box, even if engagement between the litter-box-side recess and the output-side projection is released when a large force is applied to the litter-box main portion in the front-back direction or the left-right direction, abutting the litter-box largest projection and the output-side projection on each other makes it possible to reduce the risk of the litter-box main portion being largely displaced in the front-back direction or the left-right direction with respect to the output main portion.

In such an animal litter box, it is desirable
that the litter-box main portion includes a litter-box lower opening, an outer adjacent projection and an inner adjacent projection on the lower surface of the litter-box main portion,
the outer adjacent projection and the inner adjacent projection being adjacent to the litter-box-side recess in the front-back direction or the left-right direction, and
that an inner end portion of the inner adjacent projection extends along the litter-box lower opening.

According to such an animal litter box, the inner adjacent projection can reinforce the contour of the litter-box lower opening while constituting the litter-box-side recess and can thus reduce breakage of and damage to the litter-box main portion.

Further,
An animal litter box having a front-back direction, a left-right direction, and an up-down direction,
the animal litter box including:
a litter-box main portion including an upper container and a lower container,
the upper container including a plurality holes passing through the upper container in the up-down direction,
the lower container including a reception portion,
the reception portion receiving excrement that has passed through the plurality of holes;
an output main portion including an output portion,
the output portion including a top surface that comes into contact with a bottom surface of the litter-box main portion,
the output portion being configured to output a signal in accordance with a magnitude of a force that acts on the top surface; and
a position regulator including a litter-box-side regulating portion and an output-side regulating portion,
the litter-box-side regulating portion disposed on the litter-box main portion,
the output-side regulating portion disposed on the output main portion,
the litter-box-side regulating portion being an outer side surface of the litter-box main portion,
the output-side regulating portion being a portion different from the top surface,
a relative position between the litter-box main portion and the output main portion in at least one of the front-back direction and the left-right direction being regulated by abutting of the output-side regulating portion and the outer side surface of the litter-box main portion.

According to such an animal litter box, while maintaining a state in which the top surface of the output portion and the bottom surface of the litter-box main portion are in contact with each other, it is possible to reduce the risk of displacement of the position of the litter-box main portion in the front-back direction or the left-right direction with respect to the output main portion, which is caused by abutting of the position regulator and the outer side surface of the litter-box main portion.

In such an animal litter box, it is desirable
that the litter-box-side regulating portion is the outer side surface of the litter-box main portion,
that the output-side regulating portion is an output-side protrusion that is disposed outside with respect to the litter-box main portion and that projects upward, and
that an upper end of the output-side regulating portion is disposed above an upper end of the output portion.

According to such an animal litter box, it is possible to reduce the risk of displacement of the position of the litter-box main portion in the front-back direction or the left-right direction with respect to the output main portion, which is caused by abutting of the output-side protrusion and the outer side surface of the litter-box main portion.

In such an animal litter box, it is desirable that
the output-side protrusion is disposed on either of a front side and a back side in the front-back direction with respect to the litter-box main portion.

According to such an animal litter box, for example, when an animal jumps onto the animal litter box from the front side, it is possible to reduce the risk of the front-back-direction position of the litter-box main portion being displaced with respect to the output main portion.

In such an animal litter box, it is desirable that
the output-side protrusion is disposed on each of a front side and a back side in the front-back direction with respect to the litter-box main portion.

According to such an animal litter box, for example, when an animal jumps onto the animal litter box from the front side, it is possible to reduce the risk of the front-back-direction position of the litter-box main portion being displaced with respect to the output main portion.

In such an animal litter box, it is desirable that
the output-side protrusion is disposed on an one side in the left-right direction and outside with respect to the litter-box main portion.

According to such an animal litter box, for example, when an animal jumps onto the animal litter box from the one side or the other side, it is possible to reduce the risk of the left-right-direction position of the litter-box main portion the being displaced with respect to the output main portion.

In such an animal litter box, it is desirable that
the output-side protrusion is disposed on each of the one side and another side in the left-right direction and outside with respect to the litter-box main portion.

According to such an animal litter box, for example, when an animal jumps onto the animal litter box from the one side or the other side, it is possible to further reduce the risk of the left-right-direction position of the litter-box main portion the being displaced with respect to the output main portion.

In such an animal litter box, it is desirable
that the output-side protrusion is disposed on each of a front side and a back side in the front-back direction with respect to the litter-box main portion, and
that the output-side protrusion is disposed on each of the one side and another side in the left-right direction and outside with respect to the litter-box main portion.

According to such an animal litter box, for example, even when an animal jumps onto the animal litter box in any direction, it is possible to further reduce the risk of the front-back-direction position of the litter-box main portion being displaced with respect to the output main portion.

In such an animal litter box, it is desirable
that the litter-box main portion includes a lower main body having a front opening on a front side,
that the lower container is extractable and insertable through the front opening along the front-back direction,
that the output-side protrusion is disposed on the front side in the front-back direction with respect to the litter-box main portion, and
that the output-side protrusion overlaps with the lower main body, below the front opening in the up-down direction, as viewed in the front-back direction.

According to such an animal litter box, while making the lower container extractable from and insertable into the lower main body, it is possible to further reduce the risk of the litter-box main portion being displaced at least toward the front side with respect to the output main portion.

In such an animal litter box, it is desirable
that the litter-box main portion includes a lower main body having a front opening on a front side,
that the lower container is extractable and insertable through the front opening along the front-back direction,
that the output-side protrusion is disposed on the front side in the front-back direction with respect to the litter-box main portion, and
that the output-side protrusion overlaps with the lower main body, above the front opening in the up-down direction, as viewed in the front-back direction.

According to such an animal litter box, while making the lower container extractable from and insertable into the lower main body, it is possible to further reduce the risk of the litter-box main portion being displaced at least toward the front side with respect to the output main portion.

In such an animal litter box, it is desirable
that the litter-box main portion includes a lower main body having a front opening on a front side,
that the lower container is extractable and insertable through the front opening along the front-back direction, that the output-side protrusion is disposed on the front side in the front-back direction with respect to the litter-box main portion, and
that the output-side protrusion overlaps with the lower main body, outside the front opening in the left-right direction, as viewed in the front-back direction.

According to such an animal litter box, while making the lower container extractable from and insertable into the lower main body, it is possible to further reduce the risk of the litter-box main portion being displaced at least toward the front side with respect to the output main portion.

In such an animal litter box, it is desirable
that the litter-box main portion includes a lower main body having a front opening on a front side,
that the lower container is extractable and insertable through the front opening along the front-back direction,
that the output-side protrusion is disposed on the front side in the front-back direction with respect to the litter-box main portion,
that the output-side protrusion does not overlap with the front opening, as viewed in the front-back direction, and
that the output-side protrusion overlaps with the lower main body, as viewed in the front-back direction.

According to such an animal litter box, while making the lower container extractable from and insertable into the lower main body, it is possible to further reduce the risk of the litter-box main portion being displaced at least toward the front side with respect to the output main portion.

In such an animal litter box, it is desirable
that the output-side protrusion is disposed on the front side in the front-back direction with respect to the litter-box main portion, and
that the output-side protrusion includes:
an abutting portion capable of abutting the litter-box main portion; and
an extending portion extending forward from the abutting portion.

According to such an animal litter box, the configuration makes it easier for an animal to place its feet on the extending portion and then to enter the litter-box main portion, and therefore it is possible to reduce the risk of the litter-box main portion being displaced with respect to the position of the output main portion.

In such an animal litter box, it is desirable
that the litter-box main portion includes a lower main body having a front opening on a front side,
that the lower container is extractable and insertable through the front opening along the front-back direction,
that the output-side protrusion is disposed on a back side in the front-back direction with respect to the litter-box main portion,
that the output-side protrusion is disposed on each of the one side and another side in the left-right direction and outside with respect to the litter-box main portion, and
that the output-side protrusion is not disposed on the front side in the front-back direction with respect to the litter-box main portion.

According to such an animal litter box, while making the lower container extractable from and insertable into the lower main body, it is possible to further reduce the risk of the litter-box main portion being displaced at least toward the back side and in the left-right direction with respect to the output main portion.

Present Embodiment

An animal litter box 100 according to the present embodiment is a litter box used by, for example, animals, such as cats, that are kept indoors. In the present specification, "animals" includes, not only commonly known pets such as cats, dogs, rabbits, hamsters, and the like, but also young offspring of tigers, lions, and the like. Here, "user" of the animal litter box 100 denotes a person who is the owner or keeper of animals and who manages the animal litter box 100. The animal litter box 100 is placed on, for example, a placement surface, such as a floor in a room and used. In the following description, three mutually orthogonal directions are referred to as the front-back direction, the left-right direction, and the up-down direction.

First Embodiment

Overall Structure of Animal Litter Box 100

Figure 2:
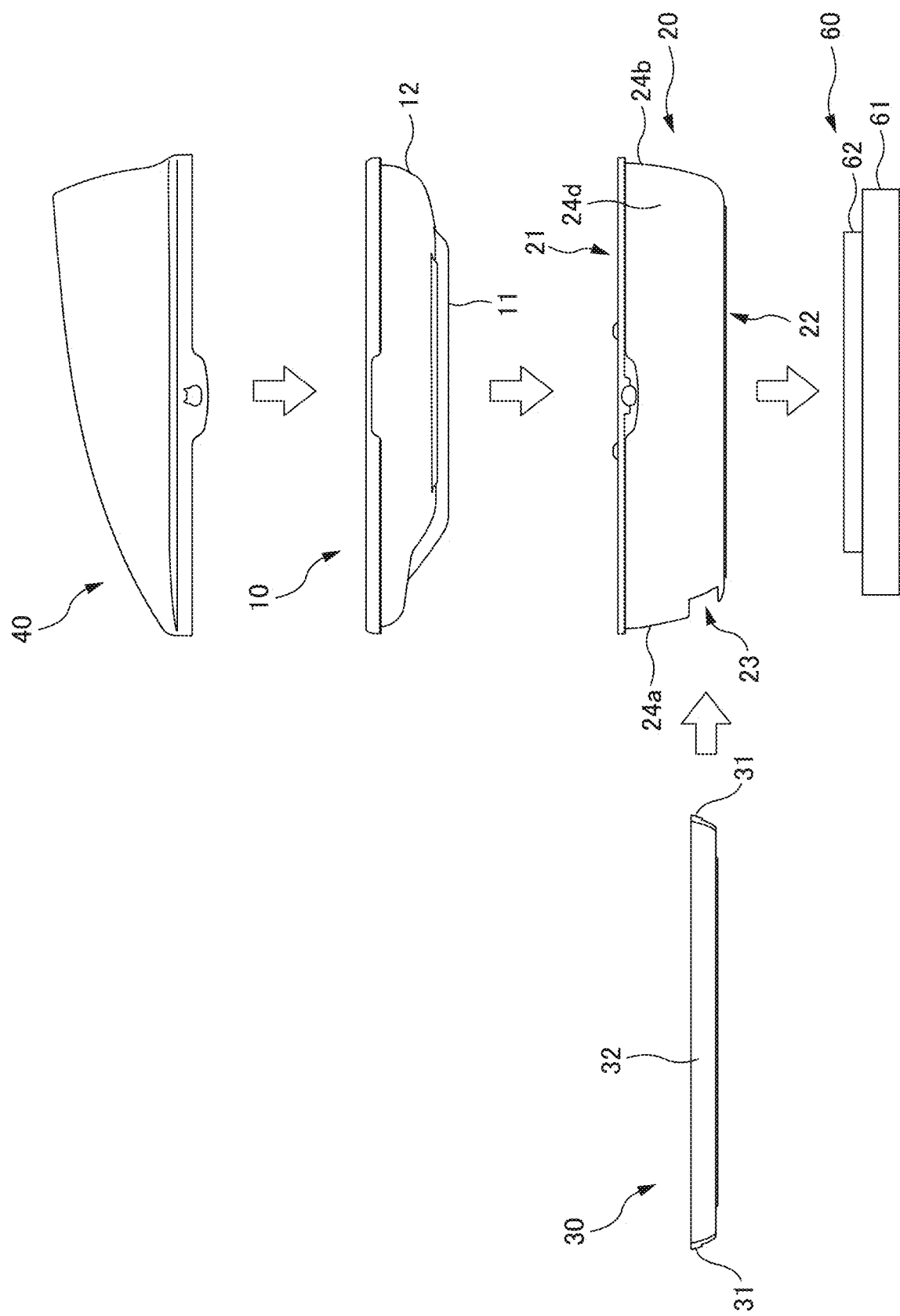
FIG. 2 is an exploded side view of the animal litter box 100.

FIG. 1 is a schematic perspective view of the animal litter box 100 of a first embodiment. FIG. 2 is an exploded side view of the animal litter box 100.

As illustrated in FIG. 1 and FIG. 2, the animal litter box 100 includes an upper container 10, a lower main body 20, a tray 30, a cover 40, and an output main portion 60. The upper container 10 is placed from above the lower main body 20, and the cover is disposed over the lower main body 20 and the upper container 10. The tray 30 is placed inside the lower main body 20, and the lower main body 20 in a state of accommodating (supporting) the tray 30 is accommodated so as to be extractable toward the front through a front opening 23. The lower main body 20 is placed on the output main portion 60 from above. Of the animal litter box 100 in a state in which the upper container 10, the lower main body 20, the tray 30, and the cover 40 are disposed, a part including the components 10, 20, 30 and 40 is referred to as a litter-box main portion 1. The litter-box main portion 1 is a so-called system litter box for animals. The litter-box main portion 1 is usable without other components when the weight of an animal or excrement is not to be measured.

For use as an animal litter box, a plurality of granular excrement treatment agents (not illustrated) are placed on a bottom surface (bottom portion 11) inside the upper container 10, and an absorbent sheet (not illustrated) is disposed on the tray 30. The excrement treatment agents are so-called cat sand and are granular treatment agents that absorb liquid excrement, such as urine, of animals and enable the liquid excrement to permeate therethrough. The absorbent sheet is a sheet member capable of absorbing liquid, such as excrement (urine), and, as the absorbent sheet, a rectangular sheet member including a liquid-permeable surface sheet, a liquid-retaining intermediate sheet, and a liquid-impermeable back sheet that are laminated and joined together is usable. Hereinafter, the animal litter box 100 in a use state, which is a state in which the animal litter box 100 is used, will be mainly described and illustrated in the drawings and the like with the excrement treatment agents and the absorbent sheet omitted.

FIG. 3A is a schematic plan view of the litter-box main portion 1 from which the cover 40 is detached, FIG. 3B is a schematic central cross-sectional view, which is a sectional view taken along A-A in FIG. 3A, and FIG. 3C is a schematic central sectional view, which is a sectional view taken along C-C in FIG. 3A. The center line C-C in, for example, FIG. 3A indicates the center of the animal litter box 100 in the left-right direction, and the animal litter box 100 is symmetrical with respect to the center line C-C in the left-right direction.

Structure of Litter-Box Main Portion 1
Structure of Upper Container 10

As illustrated in FIG. 3A to FIG. 3C and the like, the upper container 10 is a bottomed open container and includes, at the bottom, the bottom portion 11 and a curved portion 12. The bottom portion 11 has a substantially rectangular shape in plan view and includes a plurality of holes h passing therethrough in the up-down direction. Each of the holes h has a vertically elongated shape and has a size with which, of the excrement of animals, urine (liquid) passes therethrough and feces (solid) does not pass therethrough. The curved portion 12 is a portion curved upward from the bottom portion 11 and is a wall portion constituting an outer wall of the upper container 10 in a region extending upward from the entire region of the peripheral portion of the bottom portion 11.

Structure of Lower Main Body 20

Figure 4:
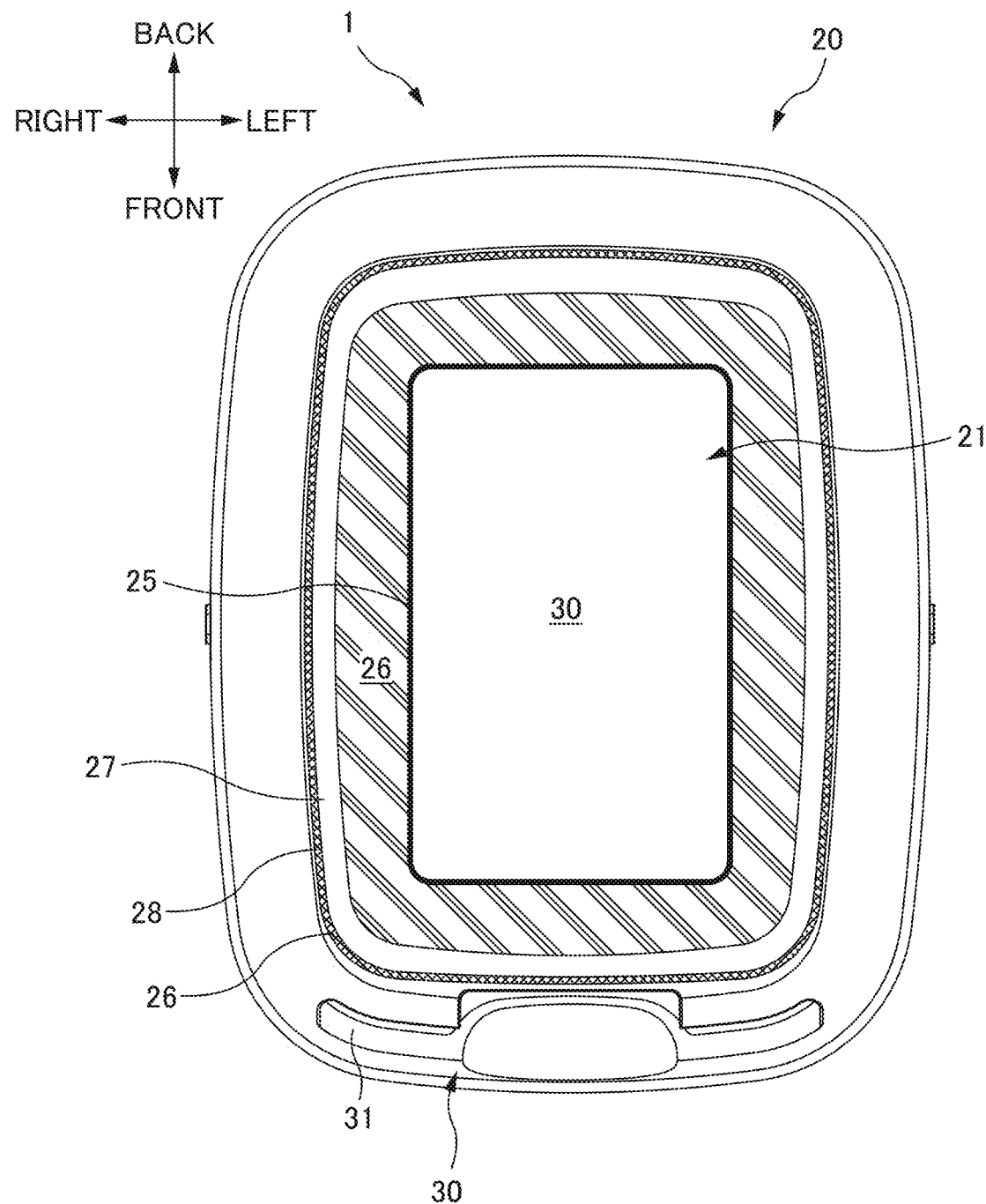
FIG. 4 is a schematic plan view of the animal litter box 100 viewed from a lower side.

FIG. 4 is a schematic plan view of the animal litter box 100 viewed from the lower side. The lower main body 20 is also a bottomed open container. The lower main body 20 includes an upper opening 21 on the upper side, a lower opening 22 on the lower side, the front opening 23 on the front side, and an outer side surface 24 at the side thereof. In addition, the lower main body 20 includes, at the bottom, an inner adjacent projection 25, a litter-box-side recess 26, an outer adjacent projection 27, and a largest projection 28. In FIG. 4, for convenience, the inner adjacent projection 25 is colored black, the litter-box-side recess 26 is indicated by hatching of three oblique lines from top left to bottom right, and the largest projection 28 is indicated by cross-hatching.

Each of the upper opening 21 and the lower opening 22 is a substantially rectangular opening passing in the up-down direction. The upper container 10 is disposed at the upper opening 21, and the upper container 10 is supported by an upper end portion of the lower main body 20. The lower opening 22 is disposed in a substantially center portion of the lower main body 20 in plan view of the lower main body. The lower opening 22 is smaller than the upper opening 21. When the lower main body 20 is placed on the output main portion 60, the lower main body 20 is outside with respect to an output portion 61, and the lower end portion (largest projection 28) of the lower main body 20 is in contact with the output main portion 60 (a top surface 61*a* of the output portion 61). The outer side surface 24 constitutes the side surface of the lower main body 20 and includes a front wall 24*a*, a back wall 24*b*, a left wall 24*c*, and a right wall 24*d*. The front opening 23 is a substantially rectangular opening portion disposed in a lower portion of the front wall 24*a* of the lower main body 20. The front opening 23 is smaller than the upper opening 21 and the lower opening 22.

In plan view, the litter-box-side recess 26 is outside with respect to the lower opening 22 and disposed to surround the lower opening 22. The litter-box-side recess 26 is recessed toward the upper side, and a most recessed portion of the litter-box-side recess 26 has a substantially flat surface.

The inner adjacent projection 25 is disposed outside the lower opening 22 and disposed to be adjacent to the litter-box-side recess 26 from the inner side of the litter-box-side recess 26 and to be surrounded by the litter-box-side recess 26. An inner end portion of the inner adjacent projection 25 extends along the lower opening 22. The inner end of the inner adjacent projection 25 is also a portion that constitutes the edge of the lower opening 22. In the section (FIG. 7A) of the litter-box main portion 1 regarding the center in the left-right direction, the lower end of the inner adjacent projection 25 is positioned on the lower side with respect to a center portion of the litter-box-side recess 26 in the front-back direction, and, in the section (FIG. 7B) of the litter-box main portion 1 regarding the center in the front-back direction, the lower end of the inner adjacent projection 25 is positioned on the lower side with respect to a center portion of the litter-box-side recess 26 in the left-right direction. The length (thickness) in the up-down direction of the inner adjacent projection 25 is thicker than the thickness in the left-right direction of the center portion of the litter-box-side recess 26 in the section of the litter-box main portion 1 regarding the center in the left-right direction and thicker than the thickness in the front-back direction of the center portion of the litter-box-side recess 26 in the section of the litter-box main portion 1 regarding the center in the front-back direction. The risk of breakage starting from the edge of the litter-box-side recess 26 is thereby reduced.

The outer adjacent projection 27 is disposed to be adjacent to the litter-box-side recess 26 from the outer side of the litter-box-side recess 26 and to surround the litter-box-side recess 26. The lower end of the outer adjacent projection 27 is positioned on the lower side with respect to the lower end of the litter-box-side recess 26.

The largest projection 28 is disposed outside with respect to the litter-box-side recess 26 and is adjacent to the outer adjacent projection 27 from the outer side of the outer adjacent projection 27. The largest projection 28 is disposed to surround the outer adjacent projection 27 from the outer side. The largest projection 28 is a portion that projects lowest in a lower container and is a portion that projects lowest in the litter-box main portion 1. In the use state, the largest projection 28 is in contact with the top surface 61*a* of the output main portion 60.

Structure of Tray 30

The tray 30 is a shallow flat box-shaped container on which an absorbent sheet is to be disposed. The tray 30 includes a grip portion 31 and a reception portion 32. The grip portion 31 is disposed at two front-back-direction end portions of the tray 30 and enables a user, when the user inserts the tray 30 into the lower main body 20 or extracts the tray 30 from the lower main body 20, to slide and move the tray 30 in the front-back direction by holding and operating the grip portion 31. The reception portion 32 has a substantially rectangular flat shape whose four sides are surrounded by wall surfaces. An absorbent sheet is disposed on the reception portion 32, and thereby the reception portion 32 receives excrement (specifically, urine) that has passed through the holes h.

Structure of Cover 40

The cover 40 is disposed over the upper container 10 and the lower main body 20 and includes a cover-opening-portion 41. The cover-opening-portion 41 is a portion that opens widely on the front side in the front-back direction and enables an animal to enter and exit the animal litter box 100 through the cover-opening-portion 41.

Structure of Output Main Portion 60

FIG. 5A is a schematic plan view of the output main portion 60. FIG. 5B is a schematic right side view of the output main portion 60. FIG. 5C is a schematic front side view of the output main portion 60. As illustrated in FIG. 5A to FIG. 5C, the output main portion 60 includes the output portion 61 and an output-side projection 62. The output portion 61 has a rectangular shape in plan view and has a predetermined thickness. In the present embodiment, the output portion 61 and the output-side projection 62 are constituted by members that differ from each other, and the output-side projection 62 is joined to the top surface 61*a* of the output portion 61 by using an adhesive or the like. The output portion 61 and the output-side projection 62 may be integrally formed of an identical material. The output-side projection 62 will be described later.

The output portion 61 outputs a signal in accordance with the magnitude of a force that acts on the top surface 61*a*. The output portion 61 includes the top surface 61*a*, side walls 61*b*, at least one load cell (not illustrated), and a controller (not illustrated). The output portion 61 includes a closed space the inner portion of which is closed by the top surface 61*a* and the side walls 61*b*. The top surface 61*a* is the upper surface of the output portion 61, and the entire region of the top surface 61 is flat throughout. The top surface 61*a* is a portion that comes into contact with the litter-box main portion 1. Specifically, the top surface 61*a* is a portion that comes into contact with the largest projection 28 of the litter-box main portion 1 and receives a force from the litter-box main portion 1. The side walls 61*b* are disposed to extend from the top surface 61*a* in the up-down direction and constitute the side surface of the output portion 61. In the present embodiment, the output portion 61 has a substantially rectangular parallelepiped shape constituted by the top surface 61*a*, which has a substantially rectangular shape in plan view, and the four side walls 61*b*. The output portion 61 includes at least one load cell in the inner portion thereof. The load cell is a sensor that converts an applied force into an electrical signal and outputs the electrical signal.

The controller is connected to the load cell by a wire or wireless signal line and receives a signal output from each load cell. The controller includes a communication unit (not illustrated), a storage unit (not illustrated), and a processing unit (not illustrated). The communication unit is a part that performs communication with the load cell or a terminal, such as a smartphone or a tablet terminal, through a wireless or wired network. The storage unit is constituted by a RAM, a ROM, and the like and is a part that stores programs and data of various kinds. For example, a detected weight before excretion, the weight of excrement, the number of times of excretion, the time of excretion, a correction value in association with the excrement treatment agents, and the like can be stored. The processing unit is constituted by a CPU and the like and is a part that performs arithmetic operations of various types. For example, processing of an arithmetic operation that, for example, calculates the weight of excrement from the weight before excretion stored in the storage unit and results of detection of a weight after excretion and the like is performed.

The processing unit clocks the time of reception of a signal, the time of communication with a terminal, and the like. For example, on the basis of a time of reception of a signal output from the load cell, a time of excretion by an animal, a time period required for excretion (time period during which an animal stays on the litter box), and the like may be calculated from a time when the weight measured by the load cell changes.

The communication unit is capable of transmitting these calculation results and data of various kinds, such as an excrement weight stored in the storage unit, to a terminal of a user. To detect a change of weight over time during weight measurement or the like, it is preferable that a configuration be made such that the storage unit accumulates information within a predetermined period. A program previously loaded in a terminal processes information received from the communication unit and displays a result thereof and the like. Consequently, a user is able to confirm information (the number of times of excretion, the time of excretion, an excretion amount, and the like) relating to excretion of an animal that uses the animal litter box 100 and confirm, for example, the health status of the animal estimated from the information relating to excretion.

Weight Measurement by Animal Litter Box 100

Figure 6:
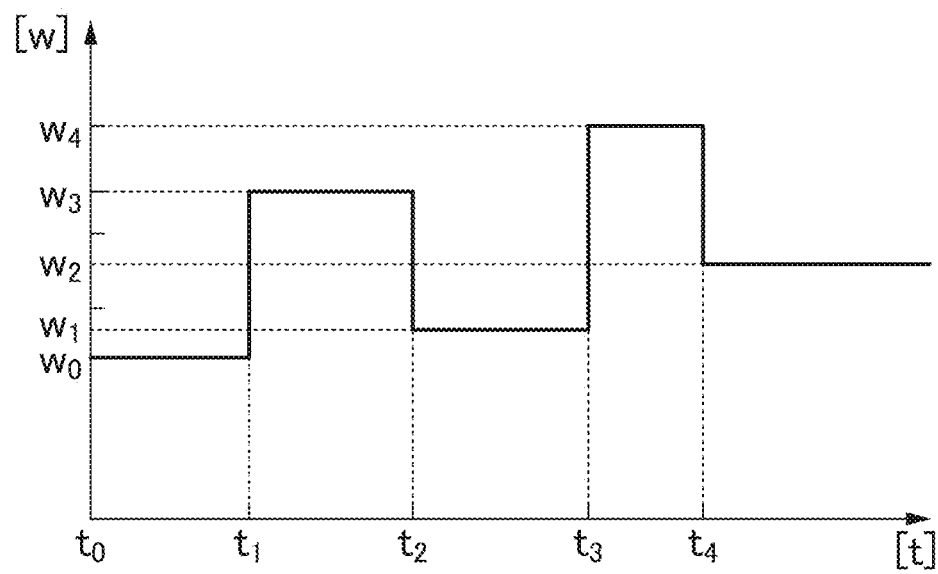
FIG. 6 illustrates determination of weight in the first embodiment.

The load cell disposed on the output portion 61 outputs a signal in accordance with the magnitude of a force that acts on the top surface 61a. In other words, the weight of an object placed from above the output main portion 60 is measured. FIG. 6 illustrates determination of weight in the first embodiment. In FIG. 6, the horizontal axis indicates time [t], and the vertical axis indicates weight [w].

A method of measuring the weight of excrement and the body weight of an animal will be specifically described. First, the magnitude of a force received by the output portion 61 (load cell) in a state in which the litter-box main portion 1 is placed from above the output main portion 60 is measured. At this time, the load cell outputs a signal in accordance with the received force. The storage unit stores a weight $W_0$ as the weight of the animal litter box 100 at a time $t_0$ output from the load cell. The weight $W_0$ is the weight of the animal litter box 100 only and does not include the weight of excrement and an animal.

Next, at a time $t_1$, when an animal enters the upper container 10 from the front side of the animal litter box 100, the force received by the output portion 61 (load cell) increases along with an increase of the weight of the litter-box main portion 1. Specifically, as a weight $W_3$ at the time $t_1$ in a state in which an animal has entered the animal litter box 100, the load cell outputs a signal, and the storage unit stores the weight $W_3$ at the time $t_1$.

The animal performs excretion in a period from the time $t_1$ to a time $t_2$. Excrement may include urine only or also include feces. In the period from the time $t_1$ to the time $t_2$, the magnitude of the force received by the output portion 61 is substantially constant (weight $W_3$).

Subsequently, when the animal exits the animal litter box 100 at the time $t_2$, the force received by the output portion 61 decreases along with a decrease of the weight of the litter-box main portion 1. Specifically, the load cell outputs a signal as a weight $W_1$ being the force received by the output portion 61 at the time $t_2$, and the storage unit stores the weight $W_1$ at the time $t_2$.

The controller calculates a difference ($W_1-W_0$) between the weight $W_1$ at the time $t_2$ and the weight $W_0$ at the time $t_0$, thereby obtaining the weight of excrement produced by the animal in the period from the time $t_1$ to the time $t_2$. Similarly, a difference ($W_3-W_1$) between the weight $W_3$ at the time $t_1$ and the weight $W_1$ at the time $t_2$ is calculated to thereby obtain the body weight of the animal.

Measurement of the weight of excrement and the body weight of an animal can be performed successively without cleaning the litter-box main portion 1 or resetting the measurement result of the controller. In the period from the time $t_2$ to the time $t_3$, no animal is on the animal litter box 100, and the magnitude of the force received by the output portion 61 is substantially constant (weight $W_1$).

At the time $t_3$, when an animal enters the upper container 10 from the front side of the animal litter box 100, the force received by the output portion 61 (load cell) increases along with an increase of the weight of the litter-box main portion 1. Specifically, the load cell outputs a signal as a weight $W_4$ at the time $t_3$ in a state in which the animal has entered the animal litter box 100, and the storage unit stores the weight $W_4$ at the time $t_3$.

The animal performs excretion in a period from the time $t_3$ to the time $t_4$. In the period from the time $t_3$ to the time $t_4$, the magnitude of the force received by the output portion 61 is substantially constant (weight $W_4$).

Subsequently, when the animal exits the animal litter box 100 at the time $t_4$, the force received by the output portion 61 decreases along with a decrease of the weight of the litter-box main portion 1. Specifically, the load cell outputs a signal as the weight $W_2$ being the force received by the output portion 61 at the time $t_4$, and the storage unit stores the weight $W_2$ at the time $t_4$.

The controller calculates a difference ($W_2-W_1$) between the weight $W_2$ at the time $t_4$ and the weight $W_1$ at the time $t_3$, thereby obtaining the weight of the excrement produced by the animal in the period from the time $t_4$ to the time $t_3$. Similarly, a difference ($W_4-W_2$) between the weight $W_4$ at the time $t_3$ and the weight $W_2$ at the time $t_4$ is calculated to thereby obtain the body weight of the animal.

The controller transmits the obtained weight of the excrement to a terminal of a user via the communication unit to enable the weight to be displayed on the screen of the terminal. The controller may transmit and display, in addition to the weight of excrement, obtained data of various kinds. The obtained data of various kinds are the number of times of excretion, the time of excretion, the body weight of an animal, and the like. In addition, accumulation of pieces of data may be indicated in a graph or a table.

Position Regulator

There are a plurality of factors that cause the litter-box main portion 1 to be displaced with respect to the output main portion 60 in the use state. The factors include, for example, an event in which excrement treatment agents are placed in the upper container 10, an event in which excrement (feces) of an animal is removed from the excrement treatment agents, an event in which the excrement treatment agents are removed from the upper container 10, an event in which members, such as the upper container 10, the lower main body 20, and the tray 30 are detached from the animal litter box 100 for, for example, cleaning, an event in which the tray 30 is extracted and inserted for replacing an absorbent sheet placed on the tray 30, and an event in which an animal jumps onto the animal litter box. When the position of the litter-box main portion 1 is displaced with respect to the output main portion 60, there is a possibility that it is impossible to accurately measure the weight of excrement or the animal or that the litter-box main portion 1 falls down, for example, due to the litter-box main portion 1 being placed in a tilted orientation on the output main portion 60.

In this regard, the animal litter box 100 includes a position regulator constituted by a litter-box-side regulating portion disposed on the litter-box main portion 1 and an output-side regulating portion disposed on the output main portion 60. The position regulator regulates a relative position between the litter-box main portion 1 and the output main portion 60 in at least one of the front-back direction and the left-right direction.

Figure 7A:
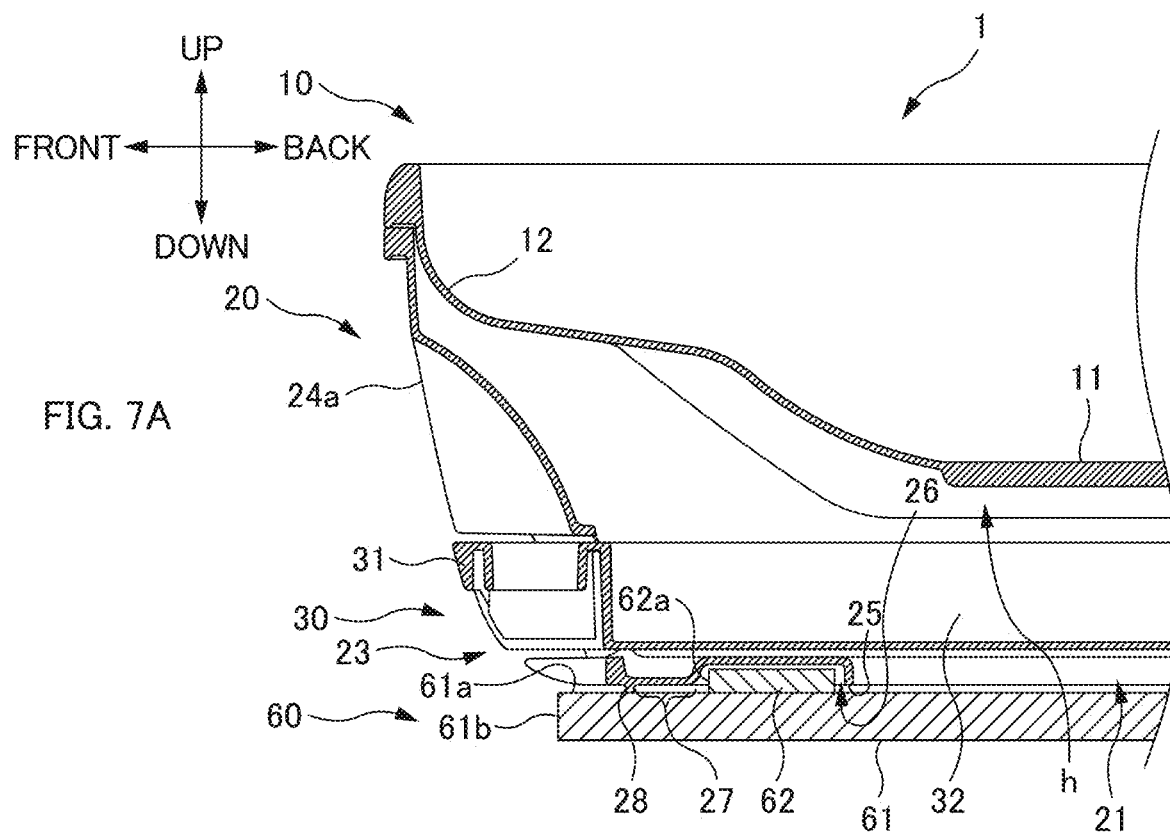
FIG. 7A is a schematic sectional view of the front part of the animal litter box 100 at the center in the left-right direction.
Figure 7B:
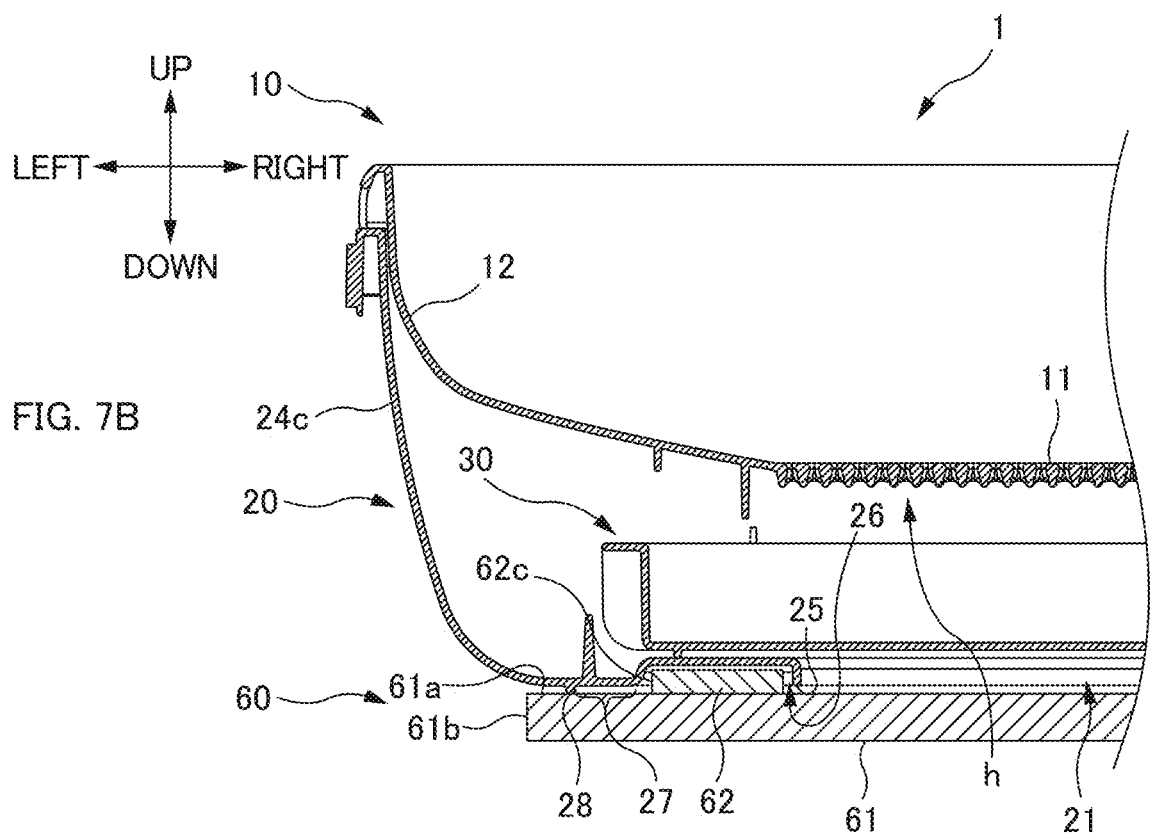
FIG. 7B is a schematic sectional view of the left part of the animal litter box 100 at the center in the front-back direction.

In the animal litter box 100, the litter-box-side regulating portion is the litter-box-side recess 26, and the output-side regulating portion is the output-side projection 62. FIG. 7A is a schematic sectional view of the front part of the animal litter box 100 at the center in the left-right direction. FIG. 7B is a schematic sectional view of the left part of the animal litter box 100 at the center in the front-back direction.

As illustrated in FIG. 5A and the like, the output-side projection 62 of the output main portion 60 is a portion projecting from the output portion 61 toward the upper side. The output-side projection 62 is annular in plan view and has an external shape extending along the external shape of the output main portion 60. The output-side projection 62 includes a front projection 62a, a back projection 62b, a left projection 62c, and a right projection 62d. The front projection 62a is disposed on the front side of the output main portion 60 to extend in the left-right direction, the back projection 62b is disposed on the back side of the output main portion 60 to extend in the left-right direction, the left projection 62c is disposed on the left side of the output main portion 60 to extend in the front-back direction, and the right projection 62d is disposed on the right side of the output main portion 60 to extend in the front-back direction. The upper ends of the front projection 62a, the back projection 62b, the left projection 62c, and the right projection 62d are substantially flush with each other.

As illustrated in FIG. 7A, the front projection 62a is engaged with the litter-box-side recess 26 of the lower main body 20, making it possible to regulate the position of the litter-box main portion 1 in the front-back direction with respect to the output main portion 60. For example, when a force from the front side toward the back side is applied to the litter-box main portion 1, the litter-box main portion 1 attempts to move toward the back side; however, the position of the litter-box main portion 1 with respect to the output main portion 60 can be regulated by a front-side side wall of the front projection 62a abutting a front-side side wall of the litter-box-side recess 26 on the inner side. Note that the upper end of the front projection 62a does not come into contact with the litter-box-side recess 26.

When, as the position regulator, the litter-box-side recess 26 and the front projection 62a are made to abut each other, there is a possibility of shock or friction being generated between the litter-box-side recess 26 and the front projection 62a. Meanwhile, when shock or friction is applied to the top surface 61a of the output portion 61, there is a possibility that it is impossible to accurately measure the weight of excrement or an animal. In this regard, the front projection 62a is a part different from both the output portion 61 and the side walls 61b thereof. Thus, the litter-box-side recess 26 and the side walls 61b do not abut each other, and it is possible to suppress a possibility of the top surface 61a, which is continuous with the side walls 61b, deforming or breaking. Consequently, it is possible to more accurately measure the weight of excrement or an animal while regulating the position of the litter-box main portion 1 in the front-back direction with respect to the output main portion 60.

In addition, it is preferable that not only the front projection 62a but also the back projection 62b be engaged with the litter-box-side recess 26 of the lower main body 20. At this time, the upper end of the back projection 62b does not come into contact with the litter-box-side recess 26. Consequently, it is possible to further regulate the position of the litter-box main portion 1 in the front-back direction with respect to the output main portion 60.

Similarly, as illustrated in FIG. 7B, the left projection 62c is engaged with the litter-box-side recess 26 of the lower main body 20, thereby enabling the position of the litter-box main portion 1 in the left-right direction with respect to the output main portion 60 to be regulated. At this time, the upper end of the left projection 62c does not come into contact with the litter-box-side recess 26. For example, when a force from the left side toward the right side is applied to the litter-box main portion 1, the litter-box main portion 1 attempts to move toward the right side; however, the position of the litter-box main portion 1 with respect to the output main portion 60 can be regulated by a left-side side wall of the left projection 62c abutting a left-side side wall of the litter-box-side recess 26 on the inner side.

In addition, it is preferable that not only the left projection 62c but also the right projection 62d be engaged with the litter-box-side recess 26 of the lower main body 20. At this time, the upper end of the right projection 62d does not come into contact with the litter-box-side recess 26. Consequently, it is possible to further regulate the position of the litter-box main portion 1 in the left-right direction with respect to the output main portion 60.

In addition, as illustrated in FIG. 5A and the like, it is preferable that the front projection 62a, the back projection 62b, the left projection 62c, and the right projection 62d all be engaged with the litter-box-side recess 26 of the lower main body 20. Consequently, it is possible to further regulate the position of the litter-box main portion 1 in the front-back direction and the position of the litter-box main portion 1 in the left-right direction with respect to the output main portion 60. Thus, even when a force is applied to the litter-box main portion 1 in any direction, it is possible to reduce the risk of the position of the litter-box main portion 1 being largely displaced.

Similarly to the front projection 62a, each of the back projection 62b, the left projection 62c, and the right projection 62d is a part different from both the output portion 61 and the side walls 61b thereof. Thus, the litter-box-side recess 26 and the side walls 61b do not abut each other, and it is possible to suppress a possibility of the top surface 61a, which is continuous with the side walls 61b, deforming or breaking. Consequently, it is possible to more accurately measure the weight of excrement or an animal while regulating the position of the litter-box main portion 1 in the front-back direction with respect to the output main portion 60.

In a state in which the front projection 62a, the back projection 62b, the left projection 62c, and the right projection 62d are all engaged with the litter-box-side recess 26, the most recessed portion of the litter-box-side recess 26 is away from each of the upper end of the front projection 62a, the upper end of the back projection 62b, the upper end of the left projection 62c, and the upper end of the right projection 62d. Consequently, a portion that causes a force to act on the top surface 61a is limited to the largest projection 28. The output-side projection 62 and the litter-box main portion 1 do not abut each other in the up-down direction but abut each other in the left-right direction or the front-back direction. Consequently, a force can be stably applied from the largest projection 28 to the top surface 61a, and it is possible to more accurately measure the weight of excrement or an animal.

As illustrated in FIG. 4, FIG. 7A and the like, in the front-back direction and the left-right direction, the litter-box-side recess 26 is preferably disposed inside with respect to the largest projection 28, and the largest projection 28 is preferably disposed outside the outer adjacent projection 27 in the front-back direction and the left-right direction. Even when a large force is applied to the litter-box main portion 1 in the front-back direction or the left-right direction, a possibility of the litter-box main portion 1 being largely displaced with respect to the output main portion 60 can be further reduced by the output-side projection 62 abutting the largest projection 28. In other words, even if engagement between the litter-box-side recess 26 and the output-side projection 62 is released when a force applied to the litter-box main portion 1 in the front-back direction or the left-right direction is large, a possibility of the litter-box main portion 1 being largely displaced with respect to the output main portion 60 can be further reduced because the largest projection 28 and the output-side projection 62 easily abut each other.

Modification of First Embodiment

The animal litter box 100 described above includes, as an output-side position regulating portion, the output-side projection 62 that includes the front projection 62a, the back projection 62b, the left projection 62c, and the right projection 62d but is not limited thereto. Each of FIG. 8A to FIG. 8D is a schematic plan view of the output main portion 60 of a modification of the first embodiment.

Figure 8A:
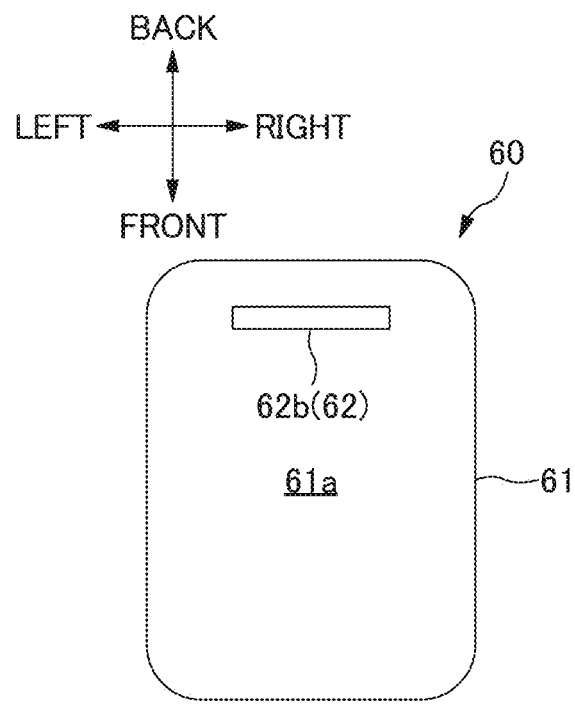
FIG. 8A is a schematic plan view of the output main portion 60 of a modification of the first embodiment.

For example, as illustrated in FIG. 8A, the output main portion 60 may include, as the output-side position regulating portion, only the back projection 62b having a substantially rectangular shape in plan view. The position of the litter-box main portion 1 in the front-back direction with respect to the output main portion 60 can be regulated by the front projection 62a being engaged with the litter-box-side recess 26 of the lower main body 20. In particular, when a force is applied from the front side toward the back side to the litter-box main portion 1, a possibility of the litter-box main portion 1 being displaced toward the back side with respect to the output main portion 60 is easily reduced.

Figure 8B:
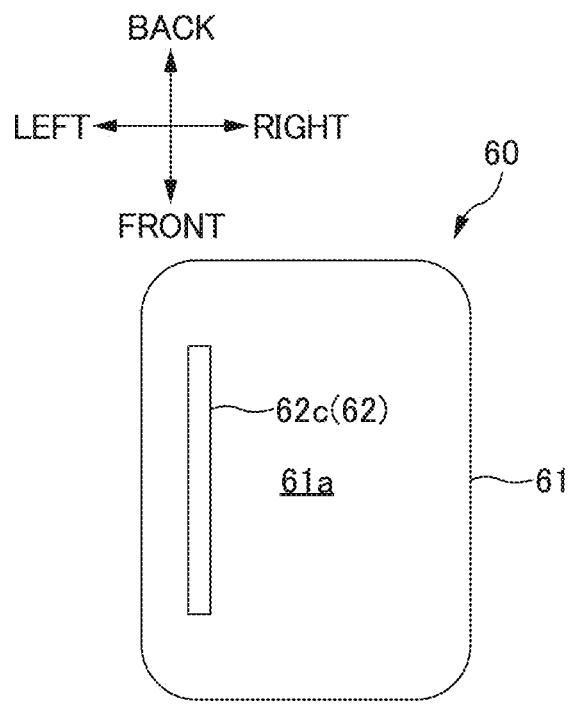
FIG. 8B is a schematic plan view of the output main portion 60 of a modification of the first embodiment.

As illustrated in FIG. 8B, the output main portion 60 may include, as the output-side position regulating portion, only the left projection 62c having a substantially rectangular shape in plan view. The position of the litter-box main portion 1 in the left-right direction with respect to the output main portion 60 can be regulated by the left projection 62c being engaged with the litter-box-side recess 26 of the lower main body 20.

Figure 8C:
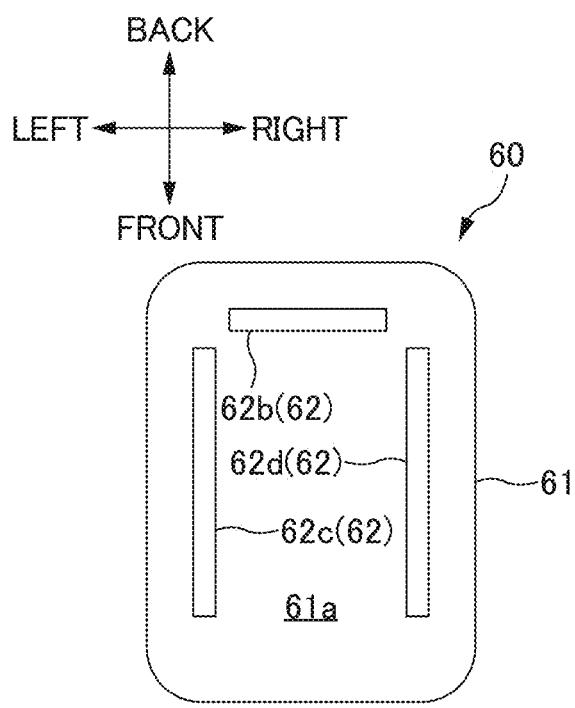
FIG. 8C is a schematic plan view of the output main portion 60 of a modification of the first embodiment.

Alternatively, as illustrated in FIG. 8C, the output main portion 60 may include, as the output-side position regulating portion, the back projection 62b, the left projection 62c, and the right projection 62d each having a substantially rectangular shape in plan view. The position of the litter-box main portion 1 in the front-back direction and the left-right direction with respect to the output main portion 60 can be regulated by the back projection 62b, the left projection 62c, and the right projection 62d being engaged with the litter-box-side recess 26 of the lower main body 20. By disposing the output-side projection 62 that responds in a direction in which the position of the litter-box main portion 1 with respect to the output main portion 60 is easily displaced in particular, the position is more easily regulated.

Figure 8D:
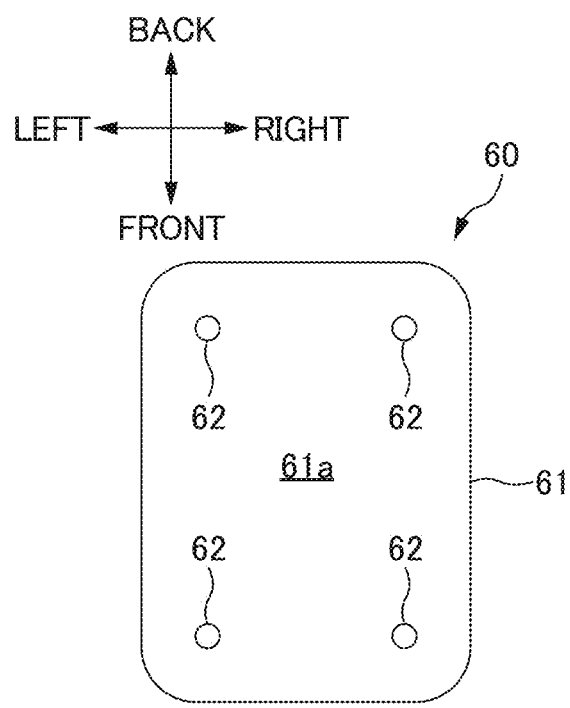
FIG. 8D is a schematic plan view of the output main portion 60 of a modification of the first embodiment.

The output-side projection 62 as the output-side regulating portion does not necessarily extend in the front-back direction or the left-right direction, and the output-side projection 62 is not limited to being rectangular. The output-side projection having a freely selected shape, such as a substantially circular shape or a substantially triangular shape in plan view, may be disposed. As illustrated in FIG. 8D, the output-side projection 62 having a substantially circular shape may be disposed at a position corresponding to a corner of the litter-box-side recess 26 when engaged with the lower main body 20. Thus, the shape and the number of the output-side projection 62 can be changed, as appropriate, in accordance with, for example, the shape of the litter-box-side recess 26 of the lower main body 20 and the magnitude of a force in the front-back or left-right direction applied to the litter-box main portion 1.

Second Embodiment

Overall Structure of Animal Litter Box 101

Figure 9:
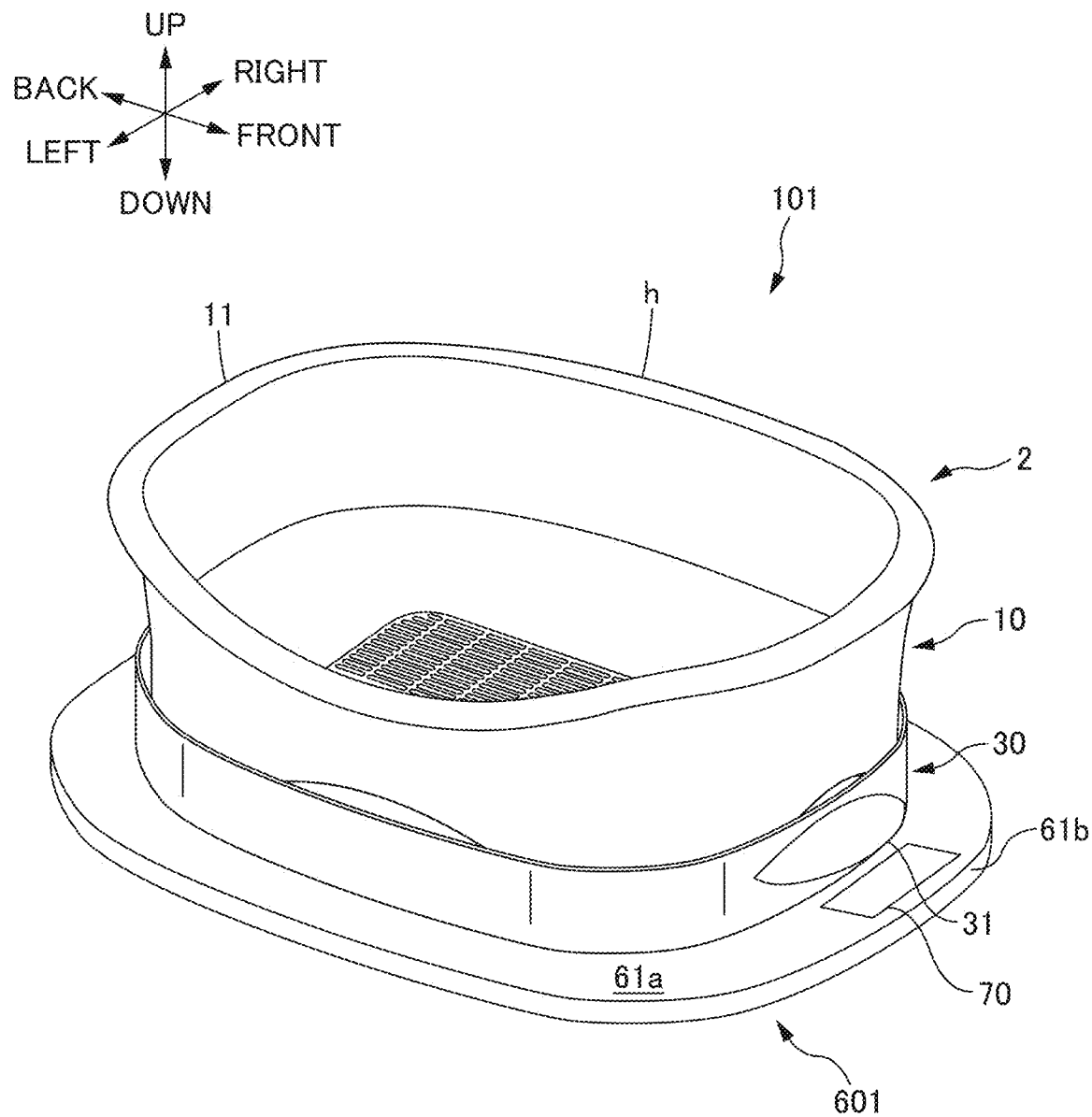
FIG. 9 is a schematic perspective view of an animal litter box 101 of a second embodiment.
Figure 10:
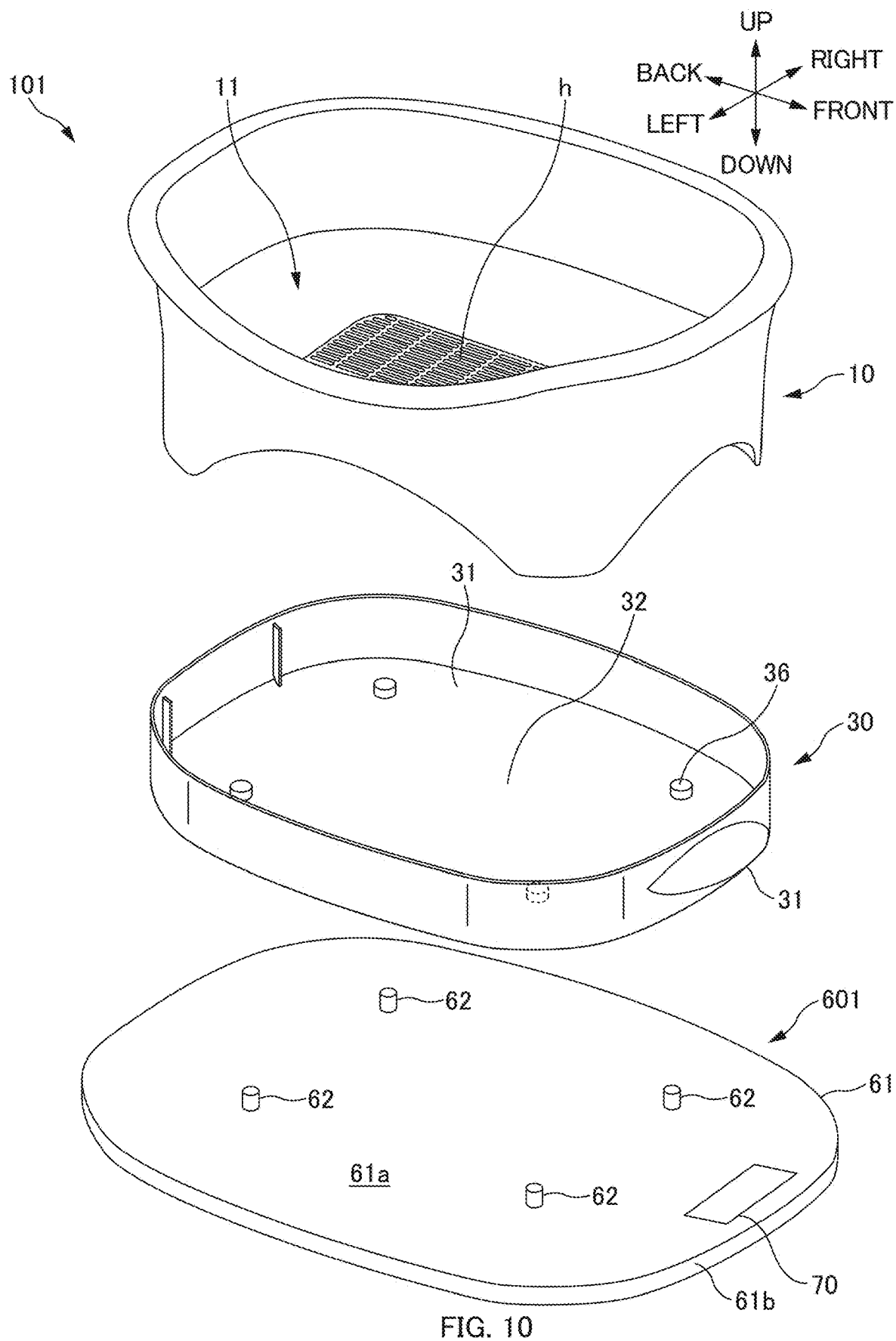
FIG. 10 is an exploded perspective view of the animal litter box 101.

FIG. 9 is a schematic perspective view of an animal litter box 101 of a second embodiment. FIG. 10 is an exploded perspective view of the animal litter box 101. In the first embodiment, the animal litter box 100 is configured such that the tray 30 is extractable and insertable in a state of being supported by the lower main body 20; however, the animal litter box 100 is not limited thereto. For example, as illustrated in FIG. 9 and FIG. 10, a litter-box main portion 2 may be configured to include a lower container 30 in which the tray 30 and the lower main body 20 are integrated to each other may be employed. The animal litter box 101 in FIG. 9 and FIG. 10 may be used with or without a cover, as appropriate.

Structure of Litter-box Main Portion 2

Structure of Upper Container 10

As illustrated in FIG. 9 and FIG. 10, the upper container 10 is a bottomed open container and includes the bottom portion 11 at the bottom thereof. The bottom portion 11 has a substantially rectangular shape in plan view and includes a plurality of holes h passing therethrough in the up-down direction. Each of the holes h has a vertically elongated shape and has a size with which, of the excrement of animals, urine (liquid) passes therethrough and feces (solid) does not pass therethrough.

Structure of Lower Container 30

The lower container 30 is a substantially rectangular flat bottomed open container on which an absorbent sheet that absorbs urine and the like is to be disposed. The lower container 30 includes the grip portion 31 disposed at each of a front end portion and a back end portion thereof, the reception portion 32, and a litter-box-side recess 36. For example, when the litter-box main portion 2 is to be separated from an output main portion 601, it is possible to lift up the litter-box main portion 2 by holding the grip portion 31. The reception portion 32 receives, with an absorbent sheet set thereon, excrement that has passed through the holes h. The litter-box-side recess 36 is a portion recessed toward the upper side from the bottom surface of the lower container 30. Four litter-box-side recesses 36 in total are disposed one each in the vicinity of each corner portion of the lower container 30, the litter-box-side recesses 36 each having a substantially circular shape in plan view.

Structure of Output Main portion 601

As illustrated in FIG. 10, the output main portion 601 includes the output portion 61, the output-side projection 62, and a display portion 70. The output portion 61 has a rectangular shape in plan view and has a predetermined thickness.

The controller has a configuration identical to that of the controller of the first embodiment, and thus, details thereof are omitted. In the first embodiment, the controller displays an obtained weight of excrement on a terminal or the like of a user via the communication unit; however, the controller is not limited thereto. As illustrated in FIG. 9 and FIG. 10, the display portion 70 may be disposed on the animal litter box 101, and the weight of excrement may be displayed on the display portion 70 through wireless or wired communication between the controller and the display portion.

The output-side projection 62 is a substantially cylindrical projection projecting from the top surface 61a of the output portion 61 toward the upper side. The output portion 61 and the output-side projection 62 may be constituted by members that differ from each other, and the output-side projection 62 may be joined to the top surface 61a of the output portion 61 by an adhesive or the like. Alternatively, the output portion 61 and the output-side projection 62 may be formed to be members integral with each other.

Weight Measurement by Animal Litter Box 101

The load cell disposed on the output portion 61 outputs a signal in accordance with the magnitude of a force that acts on the top surface 61a. A method of weight measurement by the animal litter box 101 is identical to that in the first embodiment, and thus, details thereof are omitted.

Position Regulator

The animal litter box 101 includes a position regulator constituted by a litter-box-side regulating portion disposed on the litter-box main portion 2 and an output-side regulating portion disposed on the output main portion 601. The position regulator regulates a relative position between the litter-box main portion 2 and the output main portion 601 in at least one of the front-back direction and the left-right direction.

In the animal litter box 101, the litter-box-side regulating portion is the litter-box-side recess 36, and the output-side regulating portion is the output-side projection 62. The output-side projection 62 is engaged with the litter-box-side recess 36 of the lower container 30, thereby enabling the position of the litter-box main portion 2 in the front-back direction and the left-right direction with respect to the output main portion 601 to be regulated. Specifically, a side surface of the output-side projection 62 is made to abut a side surface of the litter-box-side recess 36 to thereby regulate the position of the litter-box main portion 2 in the front-back direction and the left-right direction. In a state in which the output-side projection 62 and the litter-box-side recess 36 are engaged with each other, the upper end of the output-side projection 62 and a most recessed portion of the litter-box-side recess 36 are away from each other.

Third Embodiment

Overall Structure of Animal Litter Box 102

Figure 11:
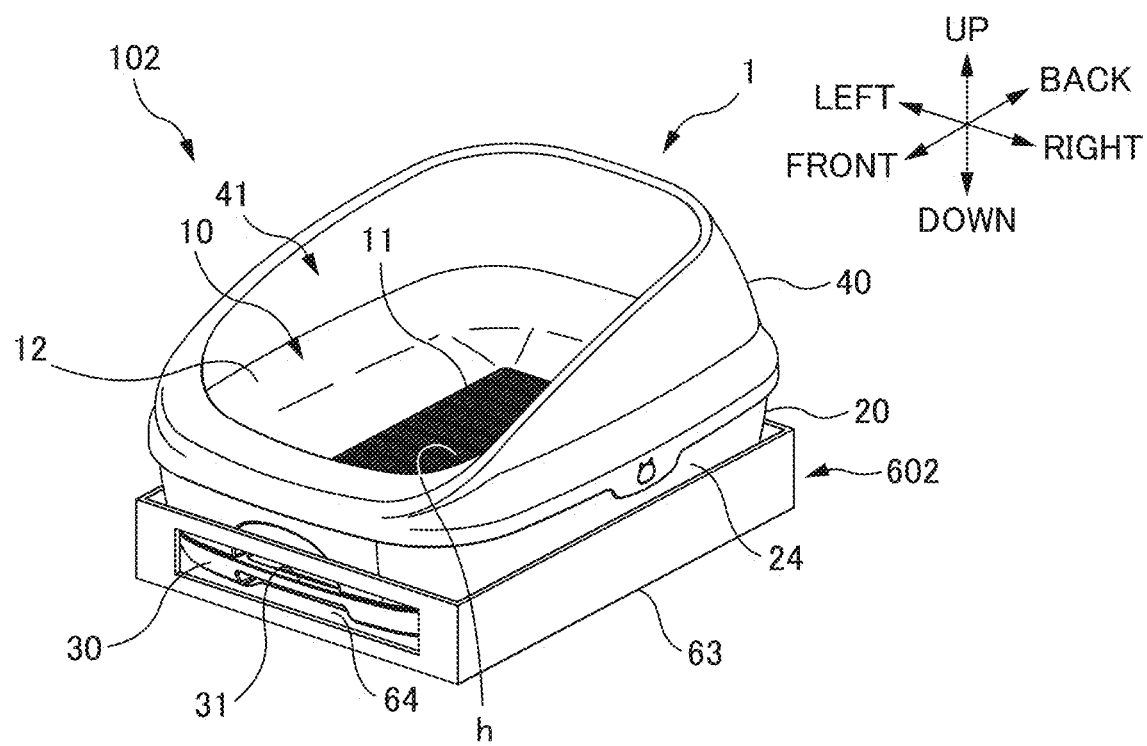
FIG. 11 is a schematic perspective view of an animal litter box 102 of a third embodiment.
Figure 12:
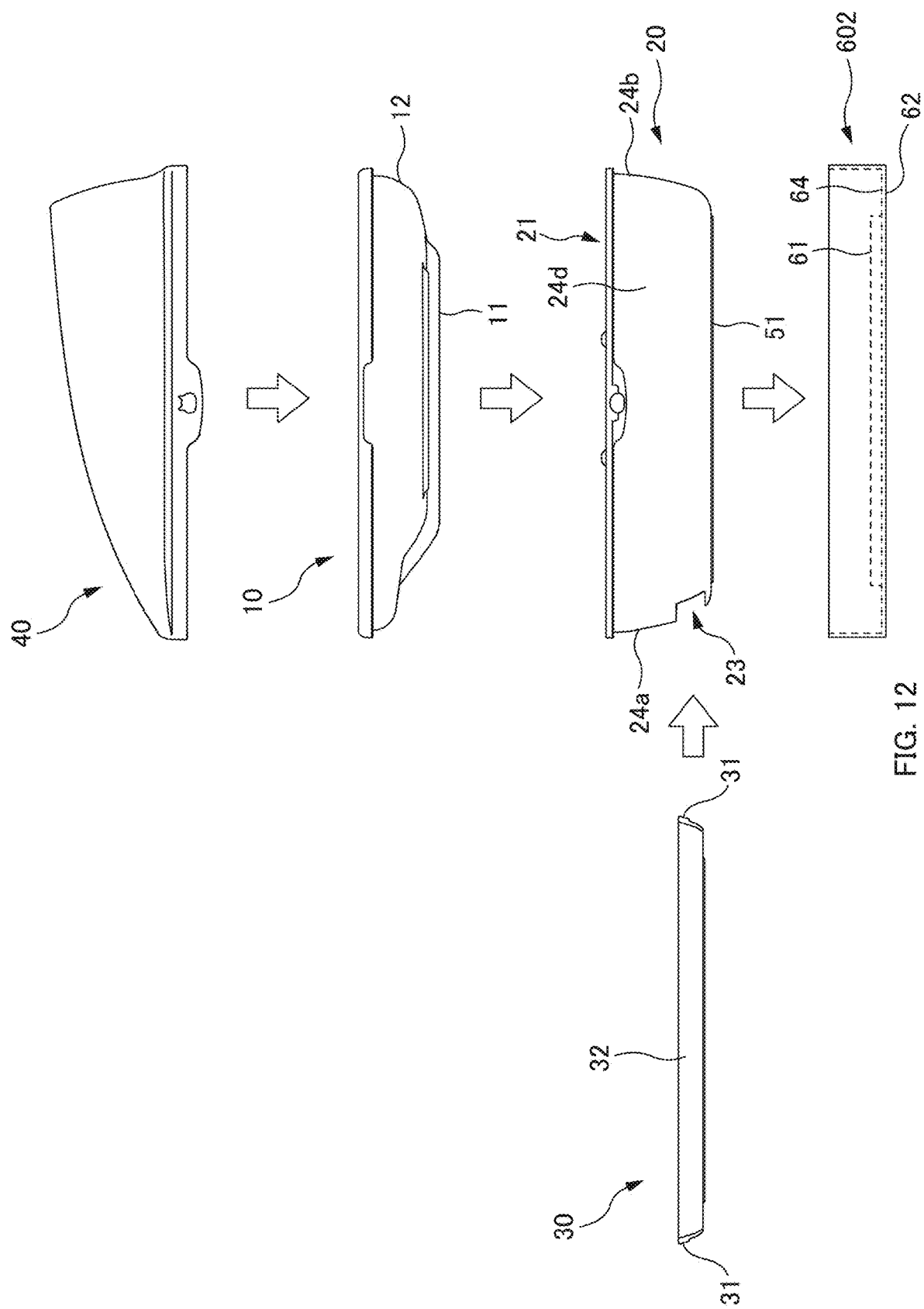
FIG. 12 is an exploded side view of the animal litter box 102.
Figure 13A:
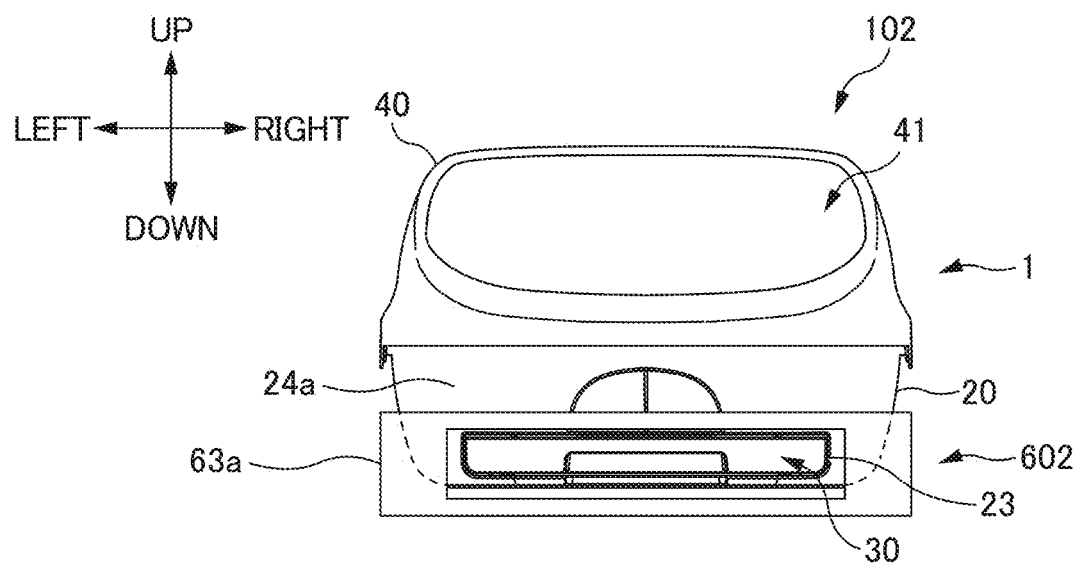
FIG. 13A is a schematic front view of the animal litter box 102 viewed from the front side.
Figure 13B:
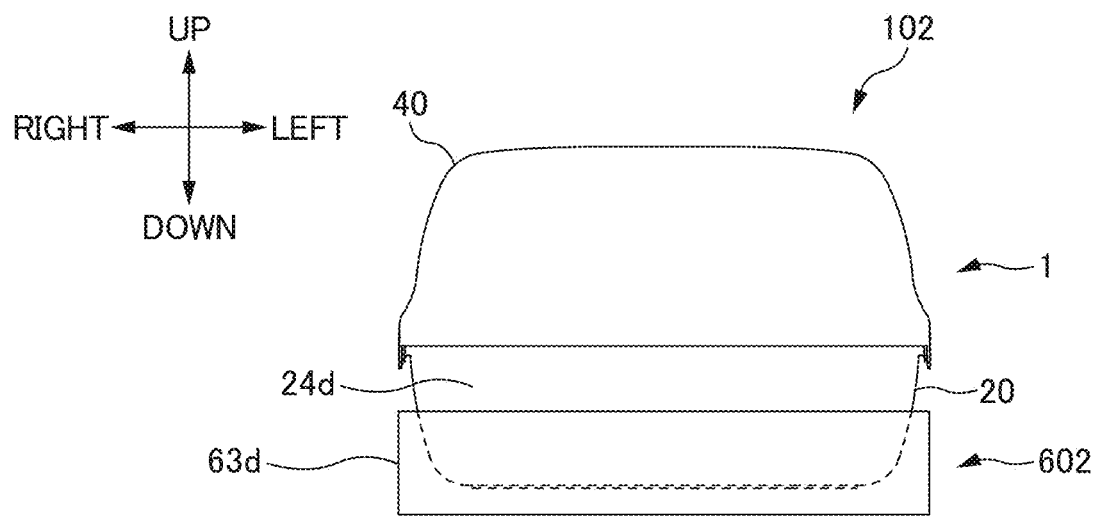
FIG. 13B is a schematic front view of the animal litter box 102 viewed from the back side.

FIG. 11 is a schematic perspective view of an animal litter box 102 of a third embodiment. FIG. 12 is an exploded side view of the animal litter box 102. FIG. 13A is a schematic front view of the animal litter box 102 viewed from the front side. FIG. 13B is a schematic front view of the animal litter box 102 viewed from the back side.

As illustrated in FIG. 11 and FIG. 12, the animal litter box 102 includes the upper container 10, the lower main body 20, the tray 30, the cover 40, and an output main portion 602. Regarding the animal litter box 102, the litter-box main portion 1 and a method of weight measurement are identical to those in the first embodiment, and thus, detailed description thereof is omitted. The output main portion 602 has a substantially box-like shape. As illustrated in FIG. 11 and the like, the animal litter box 102 in the use state is in a state in which the litter-box main portion 1 is placed from above the output main portion 602.

Structure of Output Main Portion 602

Figure 14A:
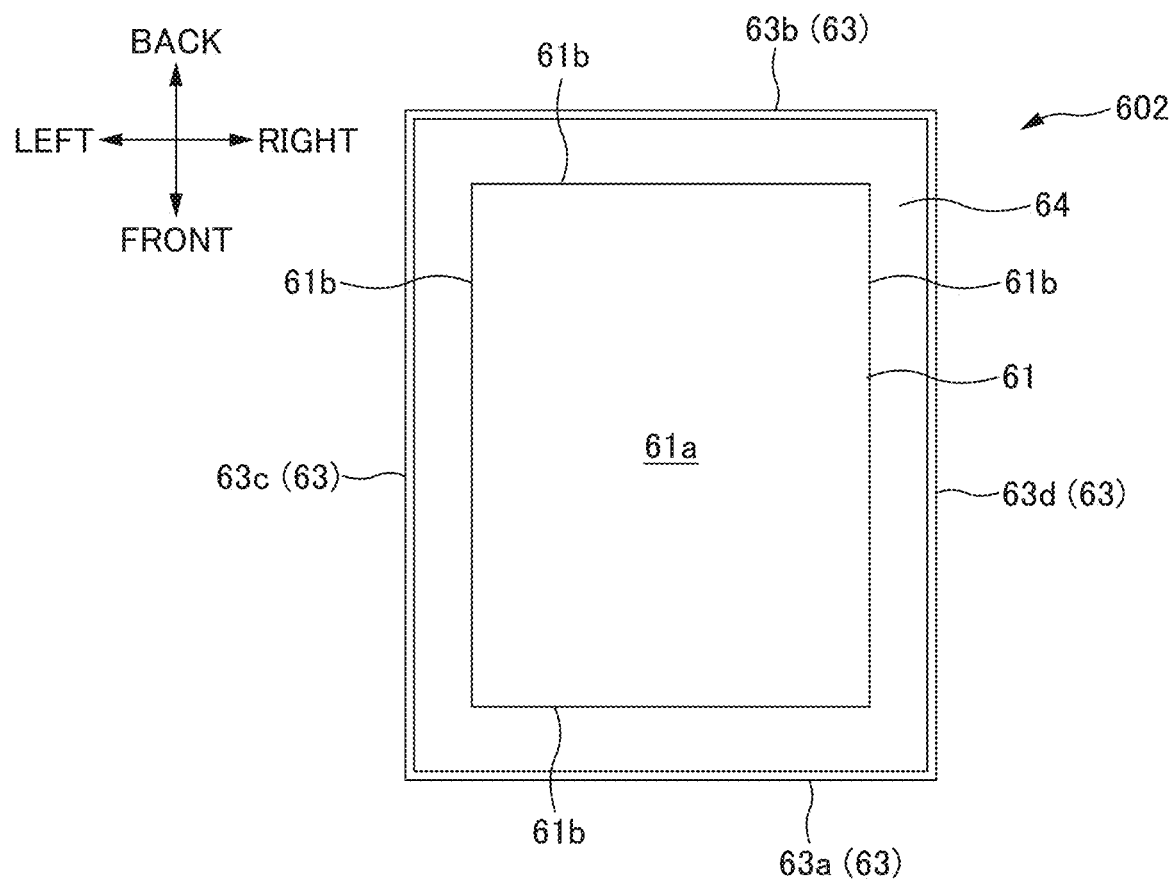
FIG. 14A is a schematic plan view of an output main portion 602.
Figure 14B:
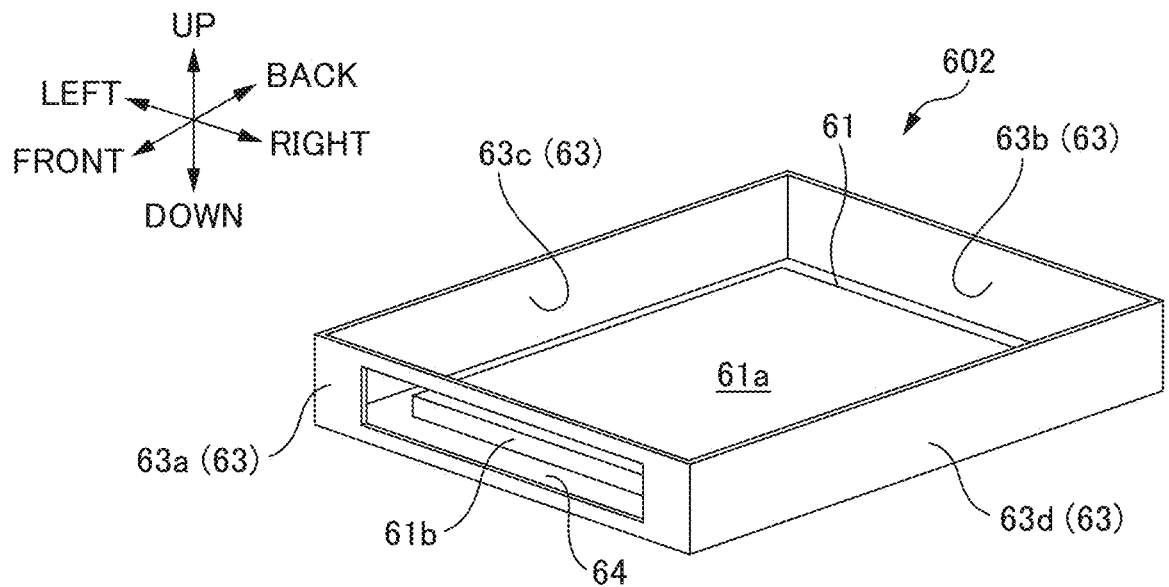
FIG. 14B is a schematic perspective view of the output main portion 602.

FIG. 14A is a schematic plan view of the output main portion 602. FIG. 14B is a schematic perspective view of the output main portion 602. As illustrated in FIG. 14A and FIG. 14B, the output main portion 602 includes the output portion 61, an output-side protrusion 63, and a bottom surface 64. The output portion 61 is placed on the bottom surface 64. The structure of the output portion 61 is identical to that in the first embodiment, and thus, detailed description thereof is omitted.

As illustrated in FIG. 14B and the like, the output-side protrusion 63 projects from the bottom surface 64 upward, and the upper end of the output-side protrusion 63 is above the upper end of the output portion 61. The output-side protrusion 63 includes a front protrusion 63a disposed on the front side with respect to the output portion 61, a back protrusion 63b disposed on the back side with respect to the output portion 61, a left protrusion 63c disposed on the left side with respect to the output portion 61, and a right protrusion 63d disposed on the right side with respect to the output portion. The front protrusion 63a, the back protrusion 63b, the left protrusion 63c, and the right protrusion 63d are wall portions each having a predetermined thickness, and the upper ends thereof are substantially flush with each other. The front protrusion 63a includes an opening in a lower portion in the up-down direction at a center portion in the left-right direction.

Position Regulator

The animal litter box 102 includes a position regulator constituted by a litter-box-side position regulating portion disposed on the litter-box main portion 1 and an output-side regulating portion disposed on the output main portion 602. The position regulator regulates a relative position between the litter-box main portion 1 and the output main portion 602 in at least one of the front-back direction and the left-right direction.

Figure 15A:
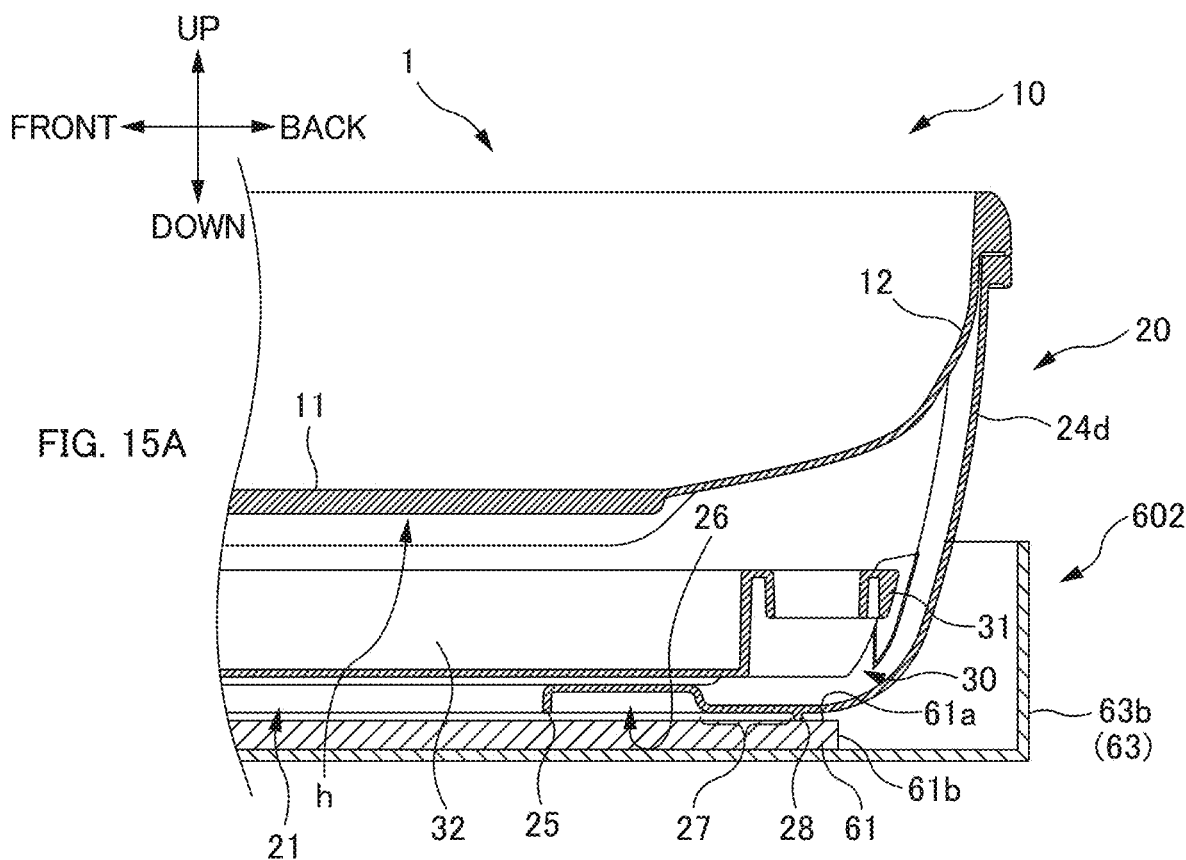
FIG. 15A is a schematic sectional view of the back part of the animal litter box 102 at the center in the left-right direction.
Figure 15B:
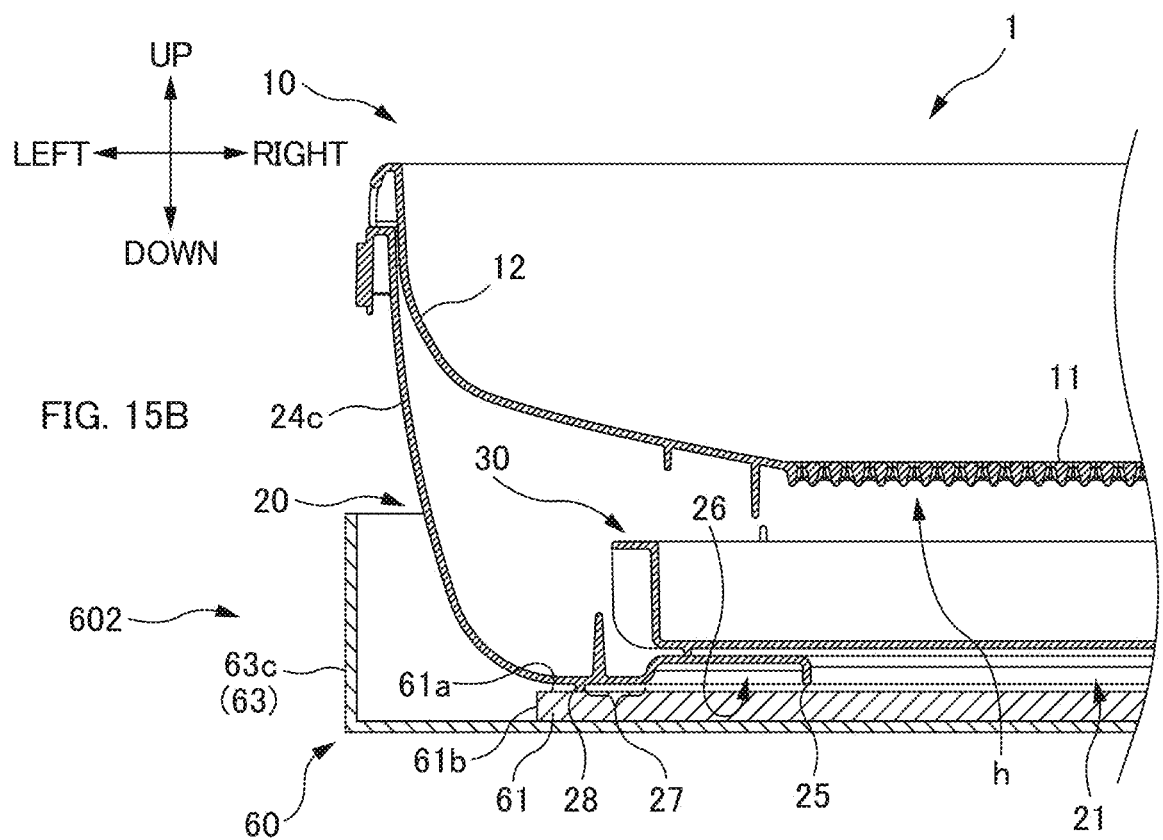
FIG. 15B is a schematic sectional view of the left part of the animal litter box 102 at the center in the front-back direction.

In the animal litter box 102, the litter-box-side regulating portion is the outer side surface 24 of the litter-box main portion 1, and the output-side regulating portion is the output-side protrusion 63. FIG. 15A is a schematic sectional view of the front part of the animal litter box 102 at the center in the left-right direction. FIG. 15B is a schematic sectional view of the left part of the animal litter box 102 at the center in the front-back direction. Each of FIG. 16A to FIG. 16D is a schematic perspective view of the output main portion 602 of a modification of the third embodiment.

As illustrated in the schematic sectional view in FIG. 15A, the output main portion 602 includes the back protrusion 63b. For example, when a force is applied from the front side toward the back side to the litter-box main portion 1, the litter-box main portion 1 attempts to move toward the back side; however, it is possible to restrict the movement of the litter-box main portion 1 by causing the back wall 24b of the litter-box main portion 1 to abut the back protrusion 63b. In other words, it is possible to reduce the risk of the litter-box main portion 1 being excessively displaced toward the back side by regulating a movement of the litter-box main portion 1 toward the back side with respect to the output main portion 602.

When the back wall 24b and the back protrusion 63b are made to abut each other as the position regulator in the front-back direction, there is a possibility of shock or friction being generated between the back wall 24b and the back projection 62b. Meanwhile, when shock or friction is applied to the top surface 61a of the output portion 61, there is a possibility that it is impossible to accurately measure the weight of excrement or an animal. In this regard, the back protrusion 63b is a part different from both the output portion 61 and the side walls 61b. Thus, the back protrusion 63b and the side walls 61b do not abut each other, and it is possible to suppress a possibility of the top surface 61a, which is continuous with the side walls 61b, deforming or breaking. Consequently, it is possible to more accurately measure the weight of excrement or an animal while regulating the position of the litter-box main portion 1 in the front-back direction with respect to the output main portion 60.

As illustrated in FIG. 16A, the output main portion 602 may be configured to include only the back protrusion 63b as the output-side protrusion 63. Consequently, it is possible to reduce the risk of the litter-box main portion 1 being excessively displaced toward the back side with respect to the output main portion 602.

In addition, the output main portion 602 preferably includes the front protrusion 63a. Due to inclusion of the front protrusion 63a in the output main portion 602, even when, for example, a force is applied from the back side toward the front side to the litter-box main portion 1, it is also possible to reduce the risk of the litter-box main portion 1 being displaced toward the front side by causing the front wall 24a of the lower main body 20 to abut the front protrusion 63a.

As illustrated in FIG. 16B, the output main portion 602 may be configured to include, as the output-side protrusion 63, only the front protrusion 63a and the back protrusion 63b. Consequently, it is possible to reduce the risk of the litter-box main portion 1 being excessively displaced in the front-back direction with respect to the output main portion 602.

Similarly, as illustrated in FIG. 15B, the output main portion 602 preferably includes the left protrusion 63c. Consequently, even when a force is applied from the right side toward the left side to the litter-box main portion 1, it is possible to reduce the risk of the litter-box main portion 1 being displaced toward the left side with respect to the output main portion 602 by causing the left side of the outer side surface 24 of the lower main body 20 to abut the left protrusion 63c in the left-right direction.

As illustrated in FIG. 16C, the output main portion 602 may be configured to include, as the output-side protrusion 63, only the left protrusion 63c. Consequently, it is possible to reduce the risk of the litter-box main portion 1 being excessively displaced toward the left side with respect to the output main portion 602.

In addition, the output main portion 602 preferably includes the right protrusion 63d. Due to inclusion of the right protrusion 63d in the output main portion 602, for example, even when a force is applied from the left side toward the right side to the litter-box main portion 1, it is also possible to reduce the risk of the litter-box main portion 1 being displaced toward the right side with respect to the output main portion 602 by causing the right side of the outer side surface 24 of the lower main body 20 to abut the right protrusion 63d in the left-right direction.

As illustrated in FIG. 16D, the output main portion 602 may be configured to include, as the output-side protrusion 63, only the left protrusion 63c and the right protrusion 63d. Consequently, it is possible to reduce the risk of the litter-box main portion 1 being excessively displaced in the left-right direction with respect to the output main portion 602.

Alternatively, as illustrated in FIG. 14A and the like, the output main portion 602 more preferably includes the front protrusion 63a, the back protrusion 63b, the left protrusion 63c, and the right protrusion 63d. As a result, in the front-back direction and the left-right direction, the position of the litter-box main portion 1 with respect to the output main portion 602 can be further regulated. Consequently, even when a force is applied to the litter-box main portion 1 in any direction, it is possible to reduce the risk of the position of the litter-box main portion 1 being largely displaced.

Preferably, as with the litter-box main portion 1, when the tray 30 is extracted or inserted through the front opening 23 in the front-back direction, the front protrusion 63a does not overlap with the front opening 23 of the lower main body 20 and overlaps with the lower main body 20 as viewed in the front-back direction. As illustrated in FIG. 13A and the like, when the animal litter box 102 is viewed in the front-back direction, a portion of the front protrusion 63a overlapping the front opening 23 is preferably in, for example, a state similar to a state of being cut out while the front protrusion 63a includes a portion overlapping the lower main body 20. Consequently, the front wall 24a of the lower main body 20 and the front protrusion 63a can be made to abut each other while the tray 30 is enabled to be extracted from the lower main body 20 in the front-back direction with the animal litter box 102 being in the use state, in which the litter-box main portion 1 is placed from above the output main portion 60. It is thus possible to reduce the risk of the litter-box main portion 1 being displaced toward the front side with respect to the output main portion 602.

The shape of the front protrusion 63a is not limited to that illustrated in, for example, FIG. 13A. Each of FIG. 17A to FIG. 17C is a schematic perspective view of the output main portion 602 of a modification of the third embodiment.

Figure 17A:
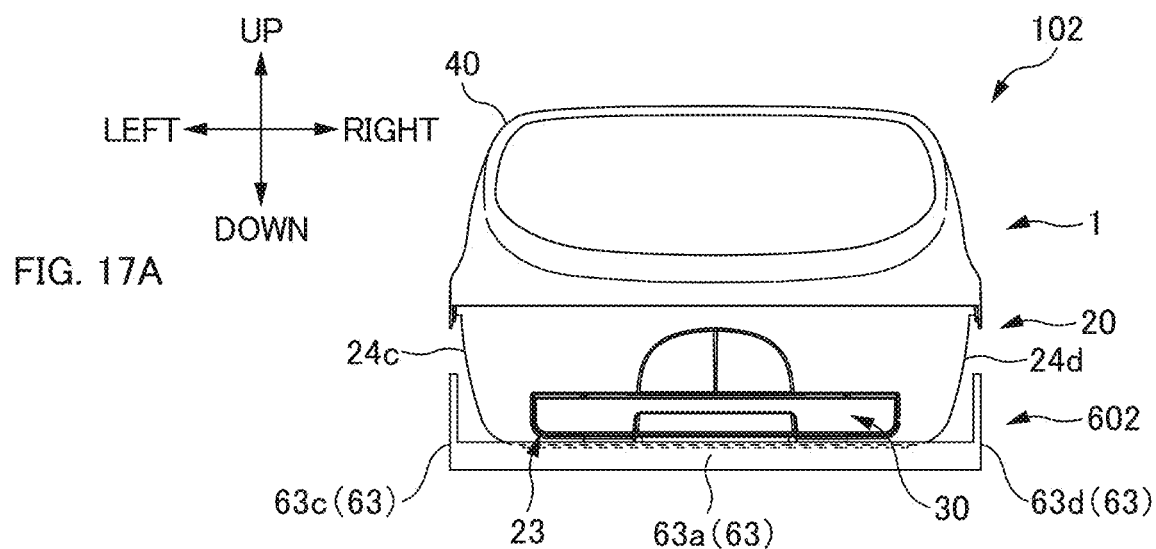
FIG. 17A is a schematic perspective view of the output main portion 602 of a modification of the third embodiment.

For example, as illustrated in FIG. 17A, the output main portion 602 may include the front protrusion 63a that overlaps with the lower main body 20, below the front opening 23 in the up-down direction, as viewed in the front-back direction. Consequently, while enabling the tray 30 to be extracted from the lower main body 20 in the front-back direction with the animal litter box 102 being in the use state, it is possible to reduce the risk of the litter-box main portion 1 being displaced toward the front side with respect to the output main portion 602 by causing the lower part of the front wall 24a of the lower main body 20 and the front protrusion 63a to abut each other.

Figure 17B:
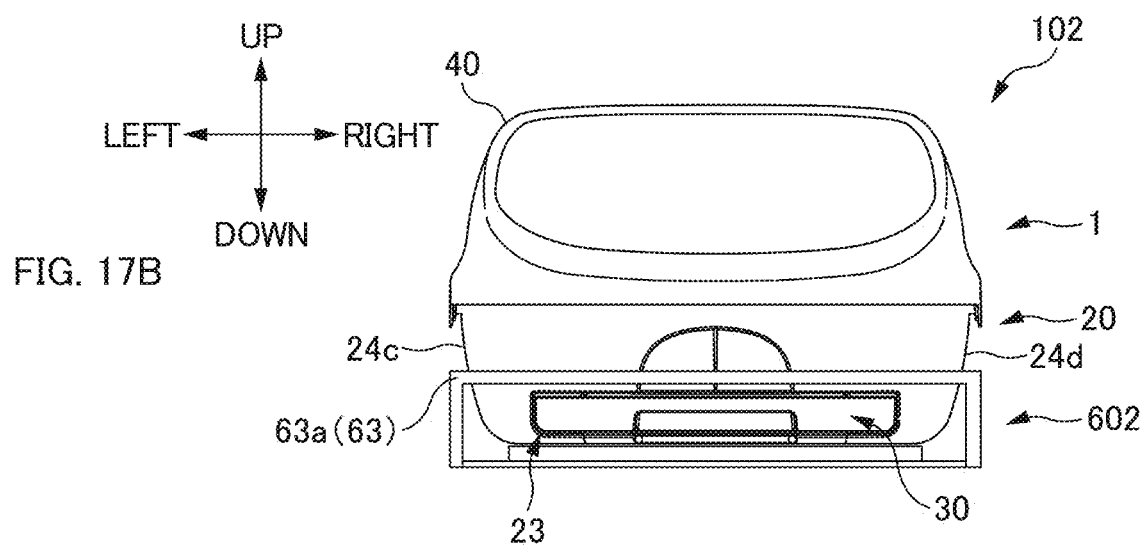
FIG. 17B is a schematic perspective view of the output main portion 602 of a modification of the third embodiment.

As illustrated in FIG. 17B, the output main portion 602 may include the front protrusion 63a that overlaps with the lower main body 20, above the front opening 23 in the up-down direction, as viewed in the front-back direction. Consequently, while enabling the tray 30 to be extracted from the lower main body 20 in the front-back direction with the animal litter box 102 being in the use state, it is possible to reduce the risk of the litter-box main portion 1 being displaced toward the front side with respect to the output main portion 602 by causing the upper part of the front wall 24a of the lower main body 20 and the front protrusion 63a to abut each other.

Figure 17C:
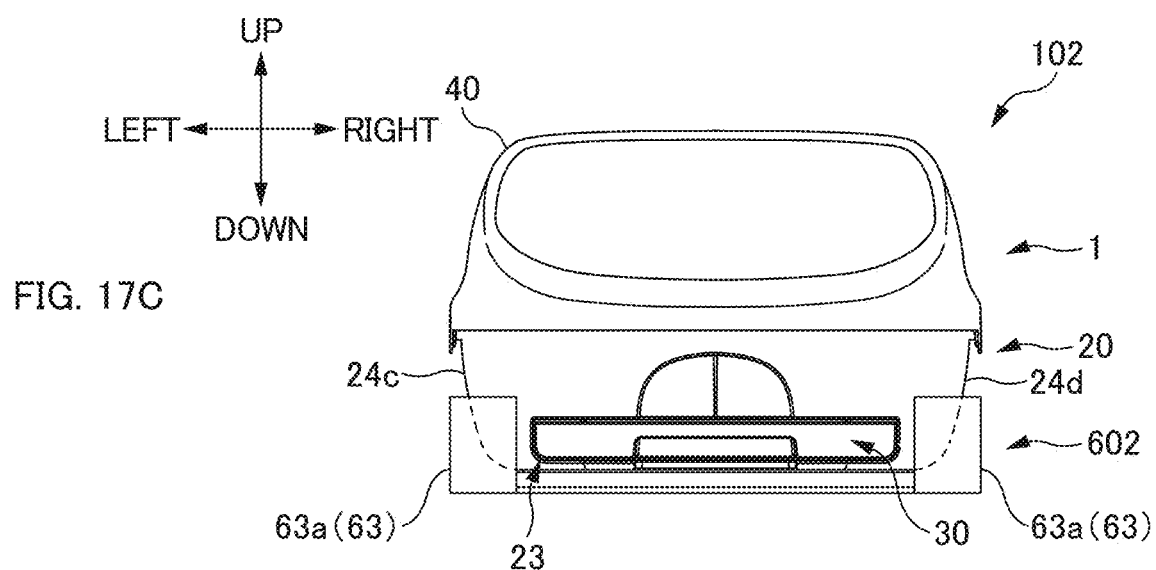
FIG. 17C is a schematic perspective view of the output main portion 602 of a modification of the third embodiment.

As illustrated in FIG. 17C, the output main portion 602 may include the front protrusion 63a that overlaps with the lower main body 20, outside the front opening 23 in the left-right direction, as viewed in the front-back direction. Consequently, while enabling the tray 30 to be extracted from the lower main body 20 in the front-back direction with the animal litter box 102 being in the use state, it is possible to reduce the risk of the litter-box main portion 1 being displaced toward the front side with respect to the output main portion 602 by causing an outer end portion of the front wall 24a of the lower main body 20 in the left-right direction and the front protrusion 63a to abut each other.

Modification of Third Embodiment

In the third embodiment described above, the output main portion 602 includes, as the output-side protrusion 63, the front protrusion 63a, the back protrusion 63b, the left protrusion 63c, and the right protrusion 63d; however, the output main portion 602 may be configured to include, without including the front protrusion 63a, the back protrusion 63b, the left protrusion 63c, and the right protrusion 63d. As a result, while enabling the tray 30 to be extracted from the lower main body 20 in the front-back direction with the animal litter box 102 being in the use state, it is possible to reduce the risk of the litter-box main portion 1 being displaced toward the back side or in the left-right direction with respect to the output main portion 602.

Figure 18A:
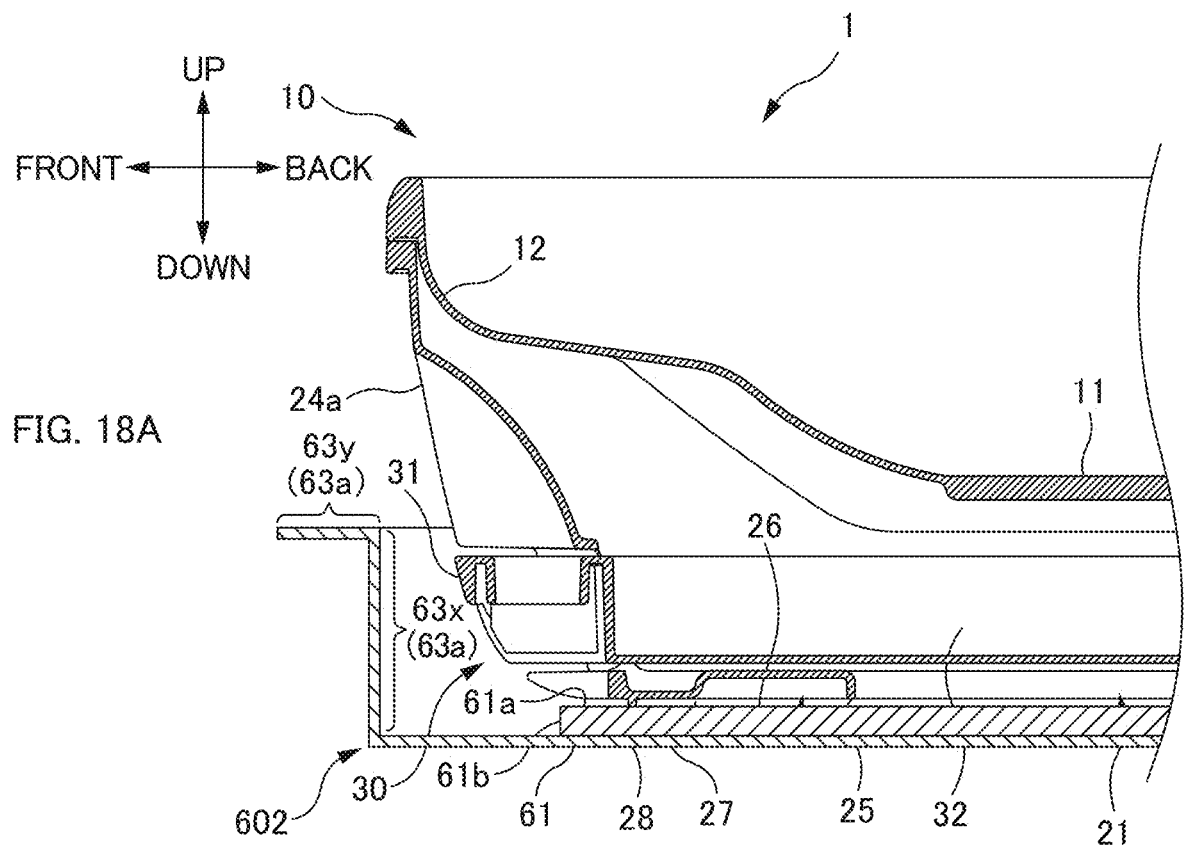
FIG. 18A is a schematic perspective view of the output main portion 602 of a modification of the third embodiment.
Figure 18B:
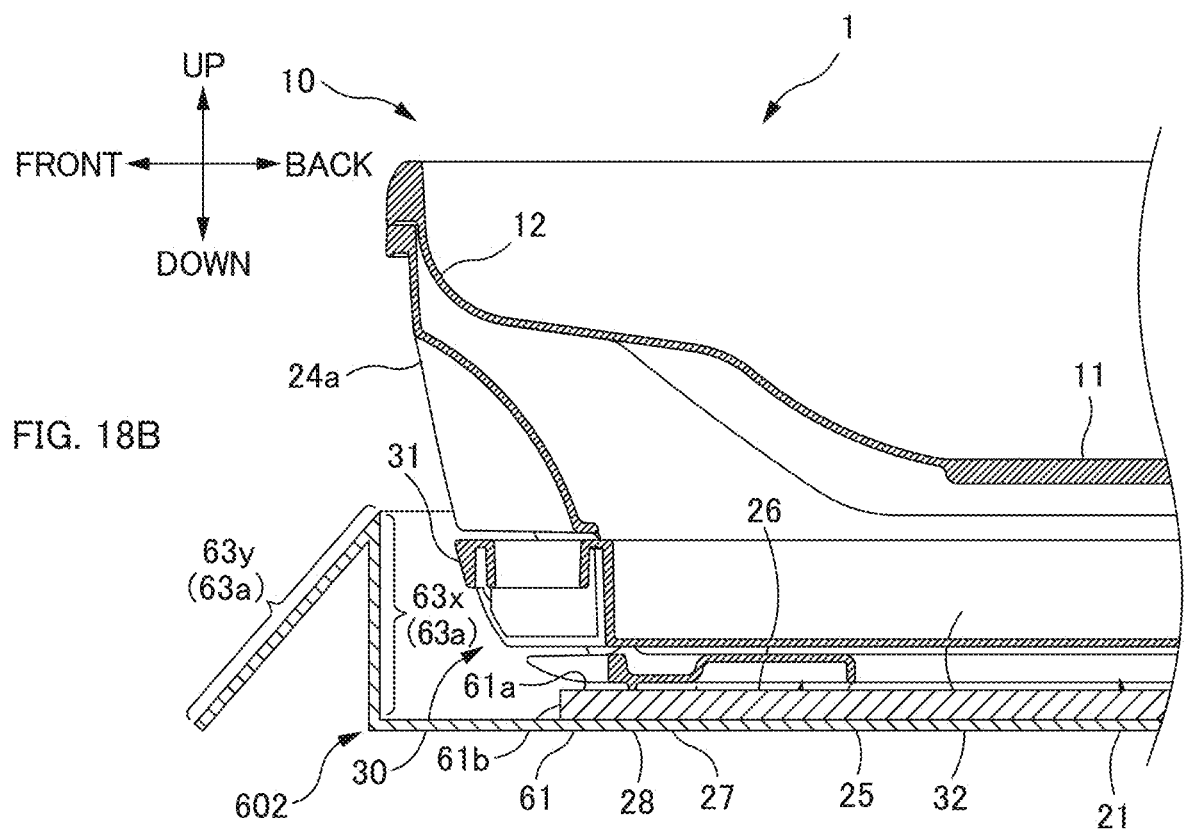
FIG. 18B is a schematic perspective view of the output main portion 602 of a modification of the third embodiment.

In addition, the front protrusion 63a may include: an abutting portion 63x capable of abutting the litter-box main portion 1; and an extending portion 63y extending forward from the abutting portion 63x. Each of FIG. 18A and FIG. 18B is a schematic perspective view of the output main portion 602 of a modification of the third embodiment. One of factors that cause the litter-box main portion 1 to move toward the back side is an event in which an animal enters the upper container 10 so as to jump onto the animal litter box 102 from the front side. In this regard, as illustrated in FIG. 18A and FIG. 18B, the output main portion 602 includes the extending portion 63y to thereby encourage an animal to take an action of placing its feet on the extending portion 63y and then entering the upper container 10. Consequently, even when a force is applied from the back side toward the front side to the litter-box main portion 1 due to some causes, while reducing the risk of the litter-box main portion 1 moving toward the back side, it is possible to restrict the movement of the litter-box main portion 1 toward the front side by causing the abutting portion 63x and the front wall 24a of the lower main body 20 to abut each other.

In the third embodiment described above, the output main portion 602 includes the output portion 61 and the output-side protrusion 63 that differs from the side walls 61b of the output portion 61; the output main portion 602 is, however, not limited thereto. For example, the output portion 61 and the output-side protrusion 63 may be provided as an integrated body, and the output-side protrusion 63 may be a side wall extending from the edge of the top surface 61a in the up-down direction. In the pet toilet described in PTL 1 (WO 2017/104216), a main container including an excretion tray and the like is disposed on the upper side of a support portion provided with a first scale and a second scale, and the first scale is engaged with a hole provided at the center of the bottom surface of the main container. Thus, the second scale of the support portion and the main container come into contact with each other locally (in a dot form) in the front-back direction or the left-right direction. In contrast, in the third embodiment or when the output portion 61 and the output-side protrusion 63 are integrally provided, the output-side protrusion 63 and the outer side surface 24 of the litter-box main portion 1 easily come into contact with each other in a larger region (linearly). It is thus possible to easily measure the weight of an animal or the weight of excrement of the animal more accurately while reducing the risk of the position of the litter-box main portion in the front-back direction or the left-right direction being displaced with respect to the output main portion.

Other Embodiments

Although the embodiments of the present disclosure have been described hereinabove, the above embodiments of the present disclosure are simply to facilitate understanding of the present disclosure and are not in any way to be construed as limiting the present disclosure. The present disclosure may variously be changed or altered without departing from its gist and encompass equivalents thereof.

In the embodiment described above, the cover 40 that includes an opening on an upper portion thereof is used; the cover 40 is, however, not limited thereto. For example, a cover configured to cover a substantially entire region of the lower-side main portion and include, on the front side, the cover-opening-portion 41 as an entrance for an animal may be employed. Alternatively, a configuration without the cover 40 may be employed.

In the embodiment described above, the weight of the litter-box main portion 1 is measured with the top surface 61a of the output portion 61 in contact with the largest projection 28 of the lower main body 20 of the litter-box main portion 1; the top surface 61a is, however, not limited thereto. For example, a configuration in which the output portion 61 projects, the output portion 61 is engaged with the lower opening 22, and the top surface 61a is in contact with only the bottom surface of the tray 30 may be employed. With the configuration in which the top surface 61a is in contact with only the tray 30, it is possible to measure the weight of urine only by measuring the weight of the tray 30 only. In this case, water-repellent excrement treatment agents is preferably used. The use of the water-repellent excrement treatment agents causes a large amount of a liquid to be permeated into a liquid-absorbing member. If excrement treatment agents that easily absorb a liquid are used, the excrement treatment agents absorb a large amount of urine, which makes accurate measurement of urine amount difficult. There is, however, a case in which a slight amount of urine is absorbed even by the water-repellent excrement treatment agents. When such excrement treatment agents are used, correction may be performed in accordance with the type of the excrement treatment agents to be used when detection of the amount of urine is performed.

REFERENCE SIGNS LIST 1 litter-box main portion, 2 litter-box main portion, 10 upper container, 11 bottom portion, 12 curved portion, 20 lower main body, 21 upper opening, 22 lower opening (litter-box lower opening), 23 front opening, 24 outer side surface, 24*a* front wall, 24*b* back wall, 24*c* left wall, 24*d* right wall, 25 inner adjacent projection, 26 litter-box-side recess (litter-box-side regulating portion), 27 outer adjacent projection, 28 largest projection (litter-box largest projection), 30 tray, lower container, 31 grip portion, 32 reception portion, 36 litter-box-side recess, 40 cover, 41 cover-opening-portion, 60 output main portion, 61 output portion, 61*a* top surface, 61*b* side wall, 62 output-side projection (output-side regulating portion), 62*a* front projection, 62*b* back projection, 62*c* left projection, 62*d* right projection, 63 output-side protrusion, 63*a* front protrusion, 63*b* back protrusion, 63*c* left protrusion, 63*d* right protrusion, 63*x* abutting portion, 63*y* extending portion, 64 bottom surface, 70 display portion, 100 animal litter box, 101 animal litter box, 102 animal litter box, 601 output main portion, 602 output main portion, h hole

The invention claimed is:

1. An animal litter box having a front-back direction, a left-right direction, and an up-down direction,
the animal litter box comprising:
a litter-box main portion including an upper container and a lower container;
the upper container including a plurality of holes passing through the upper container in the up-down direction,
the lower container including a reception portion,
the reception portion receiving excrement that has passed through the plurality of holes;
an output main portion including an output portion,
the output portion including a top surface and a side wall,
the top surface coming into contact with the litter-box main portion,
the side wall extending from an edge of the top surface in the up-down direction,
the output portion being configured to output a signal in accordance with a magnitude of a force that acts on the top surface; and
a position regulator including a litter-box-side regulating portion and an output-side regulating portion,
the litter-box-side regulating portion disposed on the litter-box main portion,
the output-side regulating portion disposed on the output main portion,
the output-side regulating portion being a portion different from the side wall,
a relative position between the litter-box main portion and the output main portion in at least one of the front-back direction and the left-right direction being regulated by the position regulator.

2. The animal litter box according to claim 1, wherein
the litter-box-side regulating portion is a litter-box-side recess disposed on a lower surface of the litter-box main portion and being recessed toward an upper side,
the output-side regulating portion is an output-side projection projecting toward the upper side from the top surface, and
the position regulator regulates the relative position between the litter-box main portion and the output main portion in at least one of the front-back direction and the left-right direction,
the regulating being performed by engaging the litter-box-side recess and the output-side projection with each other.

3. The animal litter box according to claim 2, wherein
the relative position in the front-back direction between the litter-box main portion and the output main portion is regulated by engaging the litter-box-side recess and the output-side projection with each other.

4. The animal litter box according to claim 3, wherein
the litter-box-side recess and the output-side projection are located on a front side and a back side with respect to a front-back-direction center of the animal litter box.

5. The animal litter box according to claim 2, wherein
the relative position in the left-right direction between the litter-box main portion and the output main portion is regulated by engaging the litter-box-side recess and the output-side projection with each other.

6. The animal litter box according to claim 5, wherein
the litter-box-side recess and the output-side projection are located on a one side and another side with respect to a left-right-direction center of the animal litter box.

7. The animal litter box according to claim 2, wherein
the litter-box-side recess and the output-side projection are located on a front side and a back side with respect to a front-back-direction center of the animal litter box, and
the litter-box-side recess and the output-side projection are located on a one side and another side with respect to a left-right-direction center of the animal litter box.

8. The animal litter box according to claim 2, wherein
the litter-box main portion includes a litter-box largest projection that projects lowest,
the litter-box largest projection disposed on the lower surface of the litter-box main portion, and
the litter-box-side recess is disposed inside in the front-back direction and the left-right direction with respect to the litter-box largest projection.

9. The animal litter box according to claim 8, wherein
the litter-box main portion includes an outer adjacent projection and an inner adjacent projection on the lower surface of the litter-box main portion,
the outer adjacent projection and the inner adjacent projection being adjacent to the litter-box-side recess in the front-back direction or the left-right direction, and
the litter-box largest projection projects lower with respect to the outer adjacent projection.

10. The animal litter box according to claim 2, wherein
the litter-box main portion includes a litter-box lower opening, an outer adjacent projection and an inner adjacent projection on the lower surface of the litter-box main portion,
the outer adjacent projection and the inner adjacent projection being adjacent to the litter-box-side recess in the front-back direction or the left-right direction, and
an inner end portion of the inner adjacent projection extends along the litter-box lower opening.

11. An animal litter box having a front-back direction, a left-right direction, and an up-down direction,
the animal litter box comprising:
a litter-box main portion including an upper container and a lower container,
the upper container including a plurality holes passing through the upper container in the up-down direction,
the lower container including a reception portion,
the reception portion receiving excrement that has passed through the plurality of holes;

an output main portion including an output portion,
   the output portion including a top surface that comes into contact with a bottom surface of the litter-box main portion,
   the output portion being configured to output a signal in accordance with a magnitude of a force that acts on the top surface; and
a position regulator including a litter-box-side regulating portion and an output-side regulating portion,
   the litter-box-side regulating portion disposed on the litter-box main portion,
   the output-side regulating portion disposed on the output main portion,
   the litter-box-side regulating portion being an outer side surface of the litter-box main portion,
   the output-side regulating portion being a portion different from the top surface,
   a relative position between the litter-box main portion and the output main portion in at least one of the front-back direction and the left-right direction being regulated by abutting of the output-side regulating portion and the outer side surface of the litter-box main portion.

12. The animal litter box according to claim 11, wherein the litter-box-side regulating portion is the outer side surface of the litter-box main portion,
the output-side regulating portion is an output-side protrusion that is disposed outside with respect to the litter-box main portion and that projects upward, and
an upper end of the output-side regulating portion is disposed above an upper end of the output portion.

13. The animal litter box according to claim 12, wherein the output-side protrusion is disposed on either of a front side and a back side in the front-back direction with respect to the litter-box main portion.

14. The animal litter box according to claim 13, wherein the output-side protrusion is disposed on each of a front side and a back side in the front-back direction with respect to the litter-box main portion.

15. The animal litter box according to claim 12, wherein the output-side protrusion is disposed on an one side in the left-right direction and outside with respect to the litter-box main portion.

16. The animal litter box according to claim 15, wherein the output-side protrusion is disposed on each of the one side and another side in the left-right direction and outside with respect to the litter-box main portion.

17. The animal litter box according to claim 12, wherein the output-side protrusion is disposed on each of a front side and a back side in the front-back direction with respect to the litter-box main portion, and
the output-side protrusion is disposed on each of the one side and another side in the left-right direction and outside with respect to the litter-box main portion.

18. The animal litter box according to claim 12, wherein the litter-box main portion includes a lower main body having a front opening on a front side,
the lower container is extractable and insertable through the front opening along the front-back direction,
the output-side protrusion is disposed on the front side in the front-back direction with respect to the litter-box main portion, and
the output-side protrusion overlaps with the lower main body, below the front opening in the up-down direction, as viewed in the front-back direction.

19. The animal litter box according to claim 12, wherein the litter-box main portion includes a lower main body having a front opening on a front side,
the lower container is extractable and insertable through the front opening along the front-back direction,
the output-side protrusion is disposed on the front side in the front-back direction with respect to the litter-box main portion, and
the output-side protrusion overlaps with the lower main body, above the front opening in the up-down direction, as viewed in the front-back direction.

20. The animal litter box according to claim 12, wherein the litter-box main portion includes a lower main body having a front opening on a front side,
the lower container is extractable and insertable through the front opening along the front-back direction,
the output-side protrusion is disposed on the front side in the front-back direction with respect to the litter-box main portion, and
the output-side protrusion overlaps with the lower main body, outside the front opening in the left-right direction, as viewed in the front-back direction.

21. The animal litter box according to claim 12, wherein the litter-box main portion includes a lower main body having a front opening on a front side,
the lower container is extractable and insertable through the front opening along the front-back direction,
the output-side protrusion is disposed on the front side in the front-back direction with respect to the litter-box main portion,
the output-side protrusion does not overlap with the front opening, as viewed in the front-back direction, and
the output-side protrusion overlaps with the lower main body, as viewed in the front-back direction.

22. The animal litter box according to claim 12, wherein the output-side protrusion is disposed on the front side in the front-back direction with respect to the litter-box main portion, and
the output-side protrusion includes:
   an abutting portion capable of abutting the litter-box main portion; and
   an extending portion extending forward from the abutting portion.

23. The animal litter box according to claim 12, wherein the litter-box main portion includes a lower main body having a front opening on a front side,
the lower container is extractable and insertable through the front opening along the front-back direction,
the output-side protrusion is disposed on a back side in the front-back direction with respect to the litter-box main portion,
the output-side protrusion is disposed on each of the one side and another side in the left-right direction and outside with respect to the litter-box main portion, and
the output-side protrusion is not disposed on the front side in the front-back direction with respect to the litter-box main portion.

* * * * *